United States Patent [19]

Hara

[11] Patent Number: 5,343,335
[45] Date of Patent: Aug. 30, 1994

[54] SIGNAL PROCESSING SYSTEM HAVING INTERSYMBOL-INTERFERENCE CANCELLING MEANS AND METHOD OF SAME

[75] Inventor: Masaaki Hara, Kanagawa, Japan

[73] Assignee: Sony Corporation, Tokyo, Japan

[21] Appl. No.: 103,030

[22] Filed: Aug. 6, 1993

[30] Foreign Application Priority Data

Aug. 26, 1992 [JP] Japan .................................. 4-250801

[51] Int. Cl.$^5$ ............................ G11B 5/00; G11B 5/09
[52] U.S. Cl. .......................................... 360/45; 360/32
[58] Field of Search ............... 360/45, 65, 46; 375/13, 375/14, 101, 103

[56] References Cited

U.S. PATENT DOCUMENTS

| | | | |
|---|---|---|---|
| 4,220,923 | 9/1930 | Pelchat et al. | 375/101 X |
| 4,328,585 | 5/1982 | Monsen | 375/14 |
| 4,376,308 | 3/1983 | McNair | 375/14 |
| 4,503,545 | 3/1985 | Bremer et al. | 375/101 X |
| 4,644,562 | 2/1987 | Kavehrad et al. | 375/14 |
| 4,989,262 | 1/1991 | Saito | 375/102 X |
| 5,031,195 | 7/1991 | Chevillat et al. | 375/14 |
| 5,056,117 | 10/1991 | Gitlin et al. | 375/14 X |
| 5,089,917 | 2/1992 | Kanota et al. | 375/101 X |

*Primary Examiner*—Donald Hajec
*Assistant Examiner*—Le Then Minh
*Attorney, Agent, or Firm*—Lewis H. Eslinger; Jay H. Maioli

[57] ABSTRACT

A reproduction equalizer including a linear equalizer for linearly equalizing a source signal read from a recording medium, a nonlinear cancellation means for cancelling intersymbol-interference (ISI) contained in the reproduction signal, a decoder for decoding the ISI free signal to reproduce a digital signal prior to storing into the recording medium and means for automatically calculating and/or updating the ISI data held in the nonlinear cancellation means on the basis for the equalized source signal for each address defined by the reproduced digital signal. The nonlinear cancellation means includes a lookup table storing the ISI data, a circuit for generating an address for reading out the ISI data from the lookup table, and a circuit for subtracting the ISI data read out from the lookup table from the equalized source signal. At an initial stage, the calculation means calculates the ISI data, and in a normal operation mode, the calculated ISI data is used.

32 Claims, 15 Drawing Sheets

FIG. 10

| i | k-6 k-5 k-4 k-3 k-2 k-1 k | Aodd | Aeven |
|---|---|---|---|
| B[i] | -1 1 0 -1 0 0 1 | * | * |
| A[i] | 1 1 0 1 0 0 1 | * | * |
| [A] | 1 1 0 * 0 0 1 | 0 | 1 |

| i | k-6 k-5 k-4 k-3 k-2 k-1 k | Aodd | Aeven |
|---|---|---|---|
| B[i] | 1 -1 0 -1 0 0 1 | * | * |
| A[i] | 1 1 0 1 0 0 1 | * | * |
| [A] | 1 1 0 * 0 0 1 | 1 | 0 |

SIGNAL PROCESSING SYSTEM HAVING INTERSYMBOL-INTERFERENCE CANCELLING MEANS AND METHOD OF SAME

BACKGROUND OF THE INVENTION

1. Field of the Invention

The present invention relates to a signal processing system and a method of the same. More particularly, it relates to a signal processing system having a linear equalizer, an intersymbol-interference cancelling means, and a discriminator, which can be applied to, for example, a digital data reproduction system such as a digital video-signal recording and reproducing apparatus (VTR), and a method of the same.

2. Description of the Related Art

In digital VTRs or other digital magnetic recording and reproducing apparatuses, digital data is converted to analog data and recorded on a magnetic recording medium such as a magnetic tape by a magnetic head. When reproducing the digital data, the source analog data is detected from the magnetic recording medium and equalized by a filter known as a reproduction equalizer to shape its waveform and minimize the intersymbol-interference (ISI). As such a reproduction equalizer, mention may be made of analog filter comprised of a coil (L) or capacitor (C), a transversal filter comprised of a plurality of series connected delay lines, each of which delays a signal by a predetermined unit time, connected in series, and a plurality of coefficient multipliers, or other linear equalizers (LE). The analog data linearly equalized by the linear equalizer is applied to a discriminator. There, the equalized data is compared with threshold data, thereby reproducing the original digital data before recorded on the magnetic recording medium.

When using a linear equalizer as a reproduction equalizer, however, the linear equalizer operates to match the desired frequency characteristics without separating the effective signal component and noise component included in the analog signal, so it suffers from the disadvantage that the noise component is emphasized too much. To overcome this disadvantage, a trade-off is necessary between the frequency characteristics of the reproduction equalization circuit and the S/N. Adjustment is necessary to minimize the error rate of the final digital data reproduced. The following methods have been employed for this adjustment.

In a first method, a Viterbi decoder is employed as the reproduction equalizer. Due to the use of a Viterbi decoder, maximum use of the S/N of the analog reproduction signal is possible before the discrimination. This method is known by, for example, Eto et al. "Digital Video Recording Technology", Nikkan Kogyo Shimbunsha, pp. 72-84. Details will be given below.

In a Viterbi decoder, n number of states at a certain point of time separated by values of the ISI determined in advance are defined by a combination of n bits of data discriminated prior to that time. Each time one bit worth of processing is completed, the n number of states are updated to the next n number of states. There is a history to the n number of states and an estimated sequence of likelihood of the previous discriminated values. Assuming the noise has a Gaussian distribution, the estimated likelihood of the n number of states is determined by the sum up to then of the squares of the difference between the values of the reproduced signals assuming no noise (target values) and the values of the actually reproduced signals. Also, based on the assumption that the n number of states are defined from those of all the possible previous states having the greatest estimated likelihood, the previous states are updated to the next states and the history and estimated sequence of likelihood of the discrimination values are also updated. If the most likely states are repeatedly changed in this way, at a certain stage, the history up to several bits before that stage will converge and the discriminated values up to then will be conclusively decided. In this method, the discrimination is performed making maximum effective use of the signal power of the reproduced data, and thus digital data having an extremely low error rate is obtained compared with the usual threshold discrimination. Since this Viterbi decoding method requires one to calculate the above-mentioned total sum of the squares, the size of the circuit to calculate the same becomes larger. In addition, there is still the major disadvantage that it is difficult to carry out the decoding by the clock of the data rate at a high speed, so a multistate Viterbi decoder has not been used in digital VTRs etc.

The simplest example of use of a Viterbi decoder is the application to NRZI signal processing. If recording and reproducing in an NRZI signal processing system and equalizing so that the unit pulse is given a value between (1, −1), the number of states can be expressed by two values. There is no longer a need for calculation of the total sum of squares, therefore it is possible to construct the Viterbi decoder simply. Further, if a partial response class IV (PR-IV) signal processing method is employed so that data is recorded on the recording medium by precoding of a 2-bit delay and (mod2) addition, the data is then reproduced, and the reproduced data is equalized so that the unit pulse is given, a value among (1, 0, −1), the resultant data becomes data by the NRZI signal processing method if viewing every other bit. Therefore, two parallel simple NRZI Viterbi decoders may be employed and operated at a speed half the data rate. The combination of this PR IV method and the Viterbi decoders enables construction of a Viterbi decoder practical in terms of both the circuit size and operating speed. Therefore, this is becoming the general practice in recent digital VTRs.

Below, a PR IV Viterbi decoder will be also referred to as a "VD". In the VD explained above, assuming there is no correlation in the noise and the noise has Gaussian distribution, theoretically the S/N may be improved by 3 dB compared with threshold discrimination. However, noise is given correlation by passing through the linear equalizer. Also, it is difficult to perform equalization in practice according to the PR IV standard. Therefore, it is still not possible to realize the improvement expected with a Viterbi decoder.

Below, as a second method, an explanation will be made of the use of a nonlinear equalizer as a reproduction equalizer. In the second method, the intersymbol-interference (ISI) can be suppressed by using a linear canceler (LC) or a nonlinear canceler (NLC) or other nonlinear equalizer, without emphasizing the noise. Namely, in this method, copies of the ISI determined by the combination of the bits of data preceding and succeeding a certain time are set in advance, are subtracted from the output data of the linear equalizer, and then are once again discriminated to reproduce the digital data. A linear canceler is effective only with regard to linear distortion, while a nonlinear canceler wherein copies of the ISI are used is effective with respect to nonlinear distortion as well. There are known various methods of constructing a reproduction equalizer using an NLC, but a table lookup type nonlinear canceler (NLC) enables full consideration to be given to the length of the ISI caused by the equalization error and further is simple in circuit construction.

A table lookup type NLC uses as a lookup table a random access memory (RAM) such as a dynamic RAM, or a static RAM, in which the ISI data is stored in advance, converts the combination of the discriminated values of several bits of data preceding and succeeding a certain time, which are discriminated by a first threshold discriminator based on the output data of the linear equalizer, to an address for the lookup table, reads out the value of the ISI from the lookup table at the address, subtracts the read data from the equalized data, which may be delayed by a predetermined time for adjusting the timing of the equalized data and the address generation, and performs discrimination again by a second threshold discriminator to obtain the digital data.

A reproduction equalizer in which a table lookup type NLC is employed will be described in more detail with reference to FIG. 1.

FIG. 1 is a view showing the construction of an example of a reproduction equalizer 7. The reproduction equalizer 7 includes a linear equalizer 11, a first binary discriminator 12, a first delay line 13 comprised of 2n unit time delaying elements connected in series, an ISI lookup table 14, a second delay line 15 consisting of n unit time delaying elements connected in series, a subtractor 16, and a second binary discriminator 17. The first binary discriminator 12, the first delay line 13, the ISI lookup table 14, the second delay line 15, and the subtractor 16 form a table lookup type nonlinear equalizer (NLC). The linear equalizer 11 linearly equalizes a waveform of an input signal such as analog source data read from a magnetic tape in a digital VTR, to provide linearly equalized analog data X[k], where k indicates a current time at which the input signal is obtained. The linearly equalized data X[k] is provisionally discriminated at the binary discriminator 12 to provide provisional discrimination data A[k] of (0 or 1), and also delayed by n unit times at the second delay line 15 to provide linearly equalized and delayed data X[k'], where k' indicates a time different from the current time k by the n unit times, i.e., k'=k−n. The ISI lookup table 14 stores copies of ISI data ISI {A} which are previously determined when the source analog data does not include noise. The provisional discrimination data A[k] is applied to the first delay line 13 and consecutively delayed thereat to output address components A[k] to A[k−2n] each of which consists of one bit and which are applied to the address terminals $a_1$ to $a_{2n}$ of the ISI lookup table 14. Art address {A} consists of the address components A[k] to A[k−2n] and is used to read corresponding ISI data ISI{A} from the ISI lookup table The subtractor 16 subtracts the ISI data ISI{A} read from the ISI lookup table 14 from the linearly equalized and delayed analog data X[k'] to provide analog data Y[k'] free of ISI. The ISI free analog data Y[k'] is applied to the second discriminator 17 to provide a discriminated result (final discrimination data) A'[k'] of "1" or "0". In the table lookup type NLR, the first binary discriminator 12 and the first delay line 13 function as a means for generating the address {A}, and the second delay line 15 functions as a timing adjustment means for adjusting the time of the linearly equalized analog data X[k] to the ISI data ISI{A}.

Table 1 shows nomenclatures of the above signals.

TABLE 1

| Symbols | Meanings |
| --- | --- |
| k | current time |
| k' | delay time delayed from k by n unit times $k' = k - n$ |
| {A} | address of 2n bits $\{A\} = A[k] + A[k - 1] \ldots + A[k - 2n]$ |
| X[k] | linearly equalized data |
| X[k'] | linearly equalized and delayed data |
| A[k] | provisional discrimination data of (0,1) |
| ISI{A} | intersymbol-interference(ISI) data of address {A} |
| Y[k'] | ISI free analog data |
| A'[k'] | final discrimination data |

The provisional discrimination data A{k} (A{k}=1 or 0) provisionally discriminated by the first binary discriminator 12 based on the equalized signal X[k] linearly equalized at the linear equalizer 11 becomes the address {A} of the lookup table 14 by the 2n-stage delay line 13. The address {A} is comprised of 2n bits and is determined by the 2n number of provisional discrimination data A{i}, that is, the (2n+1) number of provisional discrimination data A{i} (i=k, k−1, ..., k−2n) of the results of the discrimination of the linearly equalized data X[k] before subtraction of the ISI, from which the provisional discrimination data A[k'] (where k'=k−n) is removed. To eliminate the ISI caused by the combination of the n bits of data preceding and succeeding the time k of the provisional discrimination data, a RAM (not shown) forming the lookup table 14 has to have a capacity enabling storage of $2^{2n}$ bits of ISI data. The ISI data ISI{A} of the address {A} read from the lookup table 14 is subtracted from the linearly equalized and delayed data X[k'] output from the n-stage delay line 15 in the computation circuit (subtractor) 16 to produce the ISI free data Y[k']. This data X[k'] is discriminated by the second binary discriminator 17 and the resultant discrimination data A'[k'] is used as the final discrimination data.

In the reproduction equalizer 7, the RAM is used for the lookup table 14, so the circuit construction is extremely simple and it is possible to easily realize an NLC which can eliminate the ISI data ISI{A} when ISI data of sufficiently long preceding and succeeding bits is considered. However, since it is necessary to store in advance into the RAM the ISI data to be adjusted, which increases by the 2n power of $2(2^{2n})$, when considering the preceding and succeeding five bits, it is necessary to adjust and set 1024 types of ISI data to the lookup table 14. Tremendous work is involved in adjusting the bits of the ISI data. Therefore, in practice, the limit is about 16 combinations for the two preceding bits and two succeeding bits. Full utilization therefore could not be made of the merits of the circuit construction of the reproduction equalizer 7.

Further, in both of the linear canceler and the nonlinear canceler contained in the reproduction equalizer 7, it is a prerequisite that there be little error included in the provisional discrimination data since suitable ISI data ISI{A} is subtracted from the linearly equalized and delayed data X[k']. Error is inevitably included in the provisional discrimination data A[k]. Under actual conditions, the expected effect of improvement by the nonlinear canceler cannot be achieved. There is still the disadvantage of propagation of error.

In summary, in the reproduction equalization method, a linear equalizer, Viterbi decoder (VD), or nonlinear canceler is employed, as a reproduction equalizer, but, as mentioned above, when a linear canceler is used, since the linear equalizer tries to match the desired frequency characteristics without separation between the effective signal component and the noise component contained in the analog signal, there is the disadvantage that the noise is emphasized. Further, there is the disadvantage that a trade off is necessary between the frequency characteristics of the reproduction equalization circuit and the S/N and adjustment is required to minimize the error rate of the final digital (discrimination) data. Also, as mentioned above, in the method of reproduction equalization using a Viterbi decoder as the reproduction equalizer, since the noise is given correlation by passing through the linear equalizer, it is difficult to equalize in practice by the PR-IV standard. Therefore, there is also the disadvantage that it is not possible to realize the improvement expected with a Viterbi decoder. Further, as mentioned above, in the method of reproduction equalization using a nonlinear canceler as the reproduction equalizer, it is necessary to store in advance into the RAM used as the lookup table many bits of ISI data. The ISI data to be adjusted increases by the 2n power of $2(2^{2n})$, so when considering the preceding five and succeeding five bits, for example, it is necessary to adjust and set 1024 types of ISI data. Tremendous work is involved in adjusting each type of ISI data. Therefore, in practice the limit is about 16 types for the two preceding bits and the two succeeding bits. There is further the disadvantage that full utilization cannot be made of the merits of the circuit construction. Further, in both of the linear canceler and the nonlinear canceler, it is a prerequisite that there be little error included in the provisional discrimination data since suitable ISI data is subtracted from the linearly equalized and delayed reproduction signal. Error is inevitably included in the provisional discrimination data, and then, under actual conditions, the effect of improvement by the nonlinear canceler is deteriorated and it further suffers form the disadvantage of propagation of error.

SUMMARY OF THE INVENTION

An object of the present invention is to provide a signal processing system including an intersymbol interference(ISI) cancelling means which does not require manual adjustment of ISI data preceding and succeeding a certain time, including initialization, and which gives final discrimination data with a high accuracy.

Another object of the present invention is to provide a signal processing system including an ISI cancelling means which reduces error included in source analog (provisional discrimination) data and minimizes propagation of error included in the source analog data.

Still another object of the present invention is to provide a signal processing system including an ISI cancelling means, which reduces the ISI and the correlation of noise and thereby promotes effective utilization of the signal power.

Yet another object of the present invention is to provide a signal processing system including an ISI cancelling means, which can be constructed by a simple circuit structure and give an excellent error rate of final discrimination (decoded) data.

Still another object of the present invention is to provide a signal processing system having the above objects and features, which is applicable to digital data reproduction apparatuses such as digital video-signal reproduction apparatuses.

Yet another object of the present invention is to provide a signal processing method having the above features and providing final discrimination (decoded) data.

According to the present invention, there is provided a signal processing system including: a linear equalization means for linearly equalizing an input continuous source signal; a nonlinear cancellation means, having a memory means which stores intersymbol interference among bits in the case of reproduction of a reference source signal to a digital signal as a predetermined plurality of intersymbol interference data, for cancelling the intersymbol interference included in the linearly equalized signal; a decoding means for decoding the data output from the nonlinear cancellation means to the time series digital data corresponding to the input source signal input; and an intersymbol interference data updating means for producing new intersymbol interference data on the basis of at least the linearly equalized signal, and updating the corresponding intersymbol interference data in the memory means with the produced intersymbol interference data, designated by the decoded digital data as the address.

According to the present invention, there is also provided a signal processing system including: a linear equalization means for linearly equalizing an input continuous source signal; a nonlinear cancellation means, having a memory means which stores intersymbol interference among bits in the case of reproduction of a reference source signal to a digital signal as a predetermined plurality of intersymbol interference data, and having means which discriminates by multi-states of at least binary values the signal linearly equalized by the linear equalization means and produces an address for reading out the intersymbol interference data stored in the memory means, for cancelling the intersymbol interference included in the signal linearly equalized in said linear equalization means using the intersymbol interference data; a decoding means for decoding the data output from the nonlinear cancellation means to the time series digital data corresponding to the input source signal; and an intersymbol interference data updating means, for producing new intersymbol interference data on the basis of at least the linearly equalized signal, and updating the intersymbol interference data in the memory means designated by the address produced in the address producing means, using the produced intersymbol interference data.

According to the present invention, there is further provided a signal processing system including: a linear equalization means for linearly equalizing an input continuous source signal; a nonlinear cancellation means, having a memory means which stores intersymbol interference among bits in the case of reproduction of a reference source signal to a digital signal as a predetermined plurality of intersymbol interference data, and having means which discriminates by multi-states of at least binary values the signal linearly equalized by the linear equalization means and produces an address for reading out the intersymbol interference data stored in the memory means, for cancelling the intersymbol interference included in the signal linearly equalized in the linear equalization means using the intersymbol interference data, designated by the produced address; a decoding means for decoding the data output from the nonlinear cancellation means to the time series digital data corresponding to the input source signal; a means for monitoring fluctuations of the linearly equalized signal; and an intersymbol interference data updating means, for producing new intersymbol interference data on the basis of at least the linearly equalized signal, and updating the intersymbol interference data stored in the memory means by the produced intersymbol interference data, designated the address which is the address output from the address producing means in the nonlinear cancellation means when the fluctuations of the linearly equalized signal monitored by the monitoring means are more than a predetermined value, or the decoded data of the decoding means as the address when fluctuations in the linearly equalized signal monitored by the monitoring means are below a predetermined value.

The monitoring means monitors the envelope of the linearly equalized signal.

The nonlinear cancellation means includes an address producing means which has a first binary value discrimination means which discriminates by binary values the linearly equalized signal of the linear equalization mean and a first delay means which delays the discriminated values by a predetermined time to produce the address for the memory means, a timing adjustment means for delaying the linearly equalized signal by exactly a time corresponding to the delay time until the address is produced by the address producing means, and a subtraction means which subtracts from the delayed linearly equalized signal adjusted in timing by the timing adjustment means the intersymbol interference data read out from the memory means using the address produced by the address producing means, wherein the decoding means includes a second binary value discrimination means which discriminates by binary values the data output from the subtraction means and produces binary value discriminated decoded digital data corresponding to the input source signals. The intersymbol interference data updating means produces new intersymbol interference data based on the difference between the timing adjusted delayed linearly equalized signal and the target value, uses the binary value discriminated decoded data output from the second binary value discrimination means as the address to update the intersymbol interference data in the memory means in the nonlinear cancellation means using the produced intersymbol interference data.

The timing adjustment means includes a second delay circuit which delays the linearly equalized signal by exactly n unit times. The second delay means in the address producing means includes a delay circuit which delays the binary value discriminated data discriminated by the first binary value discrimination circuit by exactly 2n unit times. The intersymbol interference data updating means produces new intersymbol interference data based on the difference between the delayed linearly equalized signal and the target value, and uses the decoded digital data as the address to update the corresponding intersymbol interference data in the memory means using the produced intersymbol interference data.

The nonlinear cancellation means includes an address producing means comprised of a first ternary discrimination means which discriminates by ternary the signal linearly equalized by the linear equalization means, and a partial response class IV decoding means which decodes the discriminated value in accordance with partial response class IV rules to produce the address for the memory means, a timing adjustment means which delays the linearly equalized signal by exactly a time corresponding to the delay time until the address is produced in the address producing means, and a subtraction means which subtracts from the delayed linearly equalized signal adjusted in timing by the timing adjustment means the intersymbol interference data read out from the memory means using the address produced by the address producing means. The decoding means includes a second ternary discrimination means which discriminates by ternary values the data output from the subtraction means, and a second partial response class IV decoding means which decodes the discriminated data in accordance with the partial response class IV rules to produce the digital decoded data. The intersymbol interference data updating means produces new intersymbol interference data based on the difference between the timing adjusted delayed linearly equalized signal and the ternary discriminated value from the second ternary discrimination means, and uses as the address the digital decoded data from the second partial response class IV decoding means to update the intersymbol interference data in the memory means in the nonlinear cancellation means using the produced intersymbol interference data. The timing adjustment means includes a delay circuit which delays the linearly equalized signal by exactly n unit times, and the address producing means produces the address of $(2n+2)$ bits.

The nonlinear cancellation means includes a first decoding means which determines from the trends in the times series linearly equalized signal the most likely first digital signal and its state, an address producing means comprised of an address generating means which produces the address for the memory means based on the decoded data and its state, a timing adjustment means which delays the linearly equalized signal by exactly a time corresponding to the delay time until the address is produced by the address producing means, and a subtraction means which subtracts from the delayed linearly equalized signal adjusted in timing by the timing adjustment means the intersymbol interference data read out from the memory means using the address produced by the address producing means. The decoding means includes a second decoding means which determines from the trends in the subtraction results the most likely second digital signal and a second state to produce the digital decoded data corresponding to the input source signal. The intersymbol interference data updating means produces new intersymbol interference data based on the difference between the timing adjusted delayed linearly equalized signal and the decoded state output from the second decoding means, and uses as the address the digital decoded data from the second decoding means to update the intersymbol interference data in the nonlinear cancellation means using the produced intersymbol interference data. Preferably, the first decoding means comprises a Viterbi decoding means, and the second decoding means comprises a Viterbi decoding means. The timing adjustment means comprises a delay circuit which delays the linearly equalized signal (X[k]) by exactly (n+m) unit times, and the address generating means produces the address of (2n+2) bits.

The memory means in the nonlinear cancellation means and the intersymbol interference data updating means are comprised of a single writable and readable memory means and a program computation means. The writable and readable memory means functions as a temporary storage means of the memory means storing intersymbol interference data in the nonlinear cancellation means and the intersymbol interference data updating means. The program computing means (1) initializes the intersymbol interference data in the writable and readable memory means and provisional intersymbol interference data at the initiation stage of the signal processing system, (2) uses the decoded binary value discriminated data as the address each time the decoded binary value discriminated data is produced in a binary value discrimination circuit serving as the decoding means, calculates the difference between the delayed linearly equalized signal and the target value for each address, and adds the calculated value to the provisional intersymbol interference data to update the provisional intersymbol interference data, and (3) after updating the provisional intersymbol interference data by exactly a predetermined number of times for the address, uses the sum of the value obtained by dividing the intersymbol interference data by a first coefficient and the value obtained by dividing the provisional intersymbol interference data by a second coefficient M as the new intersymbol interference data and stores the same in the address portion defined by the address in the writable and readable memory means.

The intersymbol interference data is updated for all addresses, the nonlinear cancellation means is validated, and the signal processing system is made to operate.

After the signal processing system is made to operate, each time the decoded binary value discriminated data is produced in the binary value discrimination circuit serving as the decoding means, the difference between the delayed linearly equalized signal and the target value is calculated, the decoded binary value discriminated data is used as the address, and the value calculated for all the addresses are added to the provisional intersymbol interference data stored in the writable and readable memory means to update the provisional intersymbol interference data. And after the provisional intersymbol interference data is updated a predetermined number of times, the sum of the value obtained by dividing the intersymbol interference data by a third coefficient and the value obtained by dividing the provisional intersymbol interference data by a fourth coefficient is used as the new intersymbol interference data, and the storage portion defined by the address in the writable and readable memory means is updated.

The memory means in the nonlinear cancellation means and the intersymbol interference data updating means may be comprised of first and second and parallel operable writable and readable memory means which store the intersymbol interference data designated by odd addresses and the intersymbol interference data designated by even addresses, and program computation means, and the first and second writable and readable memory means function as the memory means for storing the intersymbol interference data in the nonlinear cancellation means and a temporary storage means of the intersymbol interference data updating means. The program computing means (1) initializes the intersymbol interference data in the writable and readable memory means and corresponding provisional intersymbol interference data at the initiation stage of the signal processing system, (2) uses the decoded binary value discriminated data as the address each time the decoded binary value discriminated data is produced in the binary value discrimination circuit serving as the decoding means, calculates the difference between the delayed linearly equalized signal and the target value for each address for the first writable and readable memory means when the address is odd and for the second writable and readable memory means when the address is even, and adds the calculated value to the provisional intersymbol interference data to update the provisional intersymbol interference data, and (3) after updating the provisional intersymbol interference data by exactly a predetermined number of times for the address, uses the sum of the value obtained by dividing the intersymbol interference data by a first coefficient and the value obtained by dividing the provisional intersymbol interference data by a second coefficient as the new intersymbol interference data, and stores it in the address portion defined by the address in the corresponding writable and readable memory means.

After the intersymbol interference data are updated for all addresses, the nonlinear cancellation means is validated and the signal processing system is made to operate. The nonlinear cancellation means reads out corresponding a pair of intersymbol interference data from the first and second writable and readable memory means for the address and uses the intersymbol interference data obtained by averaging the read out intersymbol interference data to cancel the intersymbol interference contained in the linearly equalized signal.

After the signal processing system is made to operate, each time the decoded binary value discriminated data is produced in the binary value discrimination circuit serving as the decoding means, the decoded binary value discriminated data is used as the address, the difference between the delayed linearly equalized signal and the target value is calculated for the address for the first writable and readable memory means when the address is odd and for the second writable and readable memory means when the address is are even, adds the value calculated to the provisional intersymbol interference data, and updates the provisional intersymbol interference data. And after the provisional intersymbol interference data is updated a predetermined number of times, the sum of the value obtained by dividing the intersymbol interference data by a third coefficient and the value obtained by dividing the provisional intersymbol interference data by a fourth coefficient is used as the new intersymbol interference data, and the storage portion defined by the address for the writable and readable memory means is updated with respect to the first or second writable and readable memory means in accordance with if the address is odd or even.

According to the present invention, there is provided a signal processing system including; a linear equalization means for linearly equalizing an input continuous source signal; a nonlinear cancellation means, having a memory means which stores intersymbol interference among bits in the case of reproduction of a reference source signal to a digital signal as a predetermined plurality of intersymbol interference data, and a first decoding means which determines from the trends of the signal linearly equalized by the linear equalization means the most likely first digital signal and its state, and having a means which produces an address for reading out intersymbol interference data stored in the memory means, for cancelling the intersymbol interference included in the signal linearly equalized in the linear equalization means using the intersymbol interference data; and a second decoding means for determining the most likely second digital signal and a second state, from the time trends in the output data of the nonlinear cancellation means, and outputting the second digital signal as the reproduced discriminated signal. Preferably, the first decoding means comprises a Viterbi decoding means, and the second decoding means comprises a Viterbi decoding means.

The signal processing system further includes an intersymbol interference data updating means for producing new intersymbol interference data on the basis of at least the linearly equalized signal, and updating the corresponding intersymbol interference data of the memory means by the produced intersymbol interference data by using the decoded digital data as an address. The intersymbol interference data updating means for producing new intersymbol interference data based on the difference between the linearly equalized signal and the Viterbi decoded state from the second Viterbi decoding means, and updating the intersymbol interference in the memory means in the nonlinear cancellation means by said produced intersymbol interference data on the basis of the digital decoded signal from the second Viterbi decoding means as the address.

The nonlinear cancellation means and the second Viterbi decoding means, each comprising a plurality of unit circuit means including, an address generating means, a memory means which stores the intersymbol interference data, a timing adjustment means which delays the linearly equalized signal by exactly a time until the address is produced, a subtraction means which subtracts from the delayed linearly equalized signal output from the timing adjustment means the intersymbol interference data read out from the memory means, and a Viterbi decoding means which Viterbi decodes the output data of the subtraction means. The address means in the first stage of the unit circuit means uses the output data of the first Viterbi decoding means to generate the address, the output data of the Viterbi decoding means in a certain stage of the unit circuit means is applied as input data of the address generating means in the next stage of the unit circuit means, the output data of the timing adjustment means in a certain stage of the unit circuit means is applied as input data of the timing adjustment means in the next stage of unit circuit, the Viterbi decoding means in the last stage of the unit circuit means functions as the second Viterbi decoding means, and the intersymbol interference data updating means updates the intersymbol interference data stored in the memory means in the plurality of unit circuit means.

According to the present invention, there is also provided a signal processing system including: a linear equalization means for linearly equalizing an input continuous signal and outputting time series linearly equalized signals a delay means for delaying the linearly equalized signal by a predetermined time and produces delayed linearly equalized signals; an intersymbol interference data holding means having a memory which stores intersymbol interference among bits in the case of reproduction of a reference source signal as a predetermined plurality of intersymbol interference data; a first binary value discrimination means for discriminating by binary values the linearly equalized signal, converting the same to a digital signal, and producing a first discrimination result; an address producing means for producing an address for reading out the corresponding intersymbol interference data stored in the intersymbol interference data holding means from the data discriminated by the first discrimination means; a subtraction means for subtracting from the delayed linearly equalized signal the read out intersymbol interference data; a second binary value discrimination means for discriminating by binary values the subtraction results and reproducing a digital signal corresponding to the input source signal, and an intersymbol interference data updating means for producing new intersymbol interference data by using the delayed linearly equalized signal and the first discriminated value or second discriminated value, and updating the intersymbol interference data held in the intersymbol interference data holding means using the produced intersymbol interference data.

According to the present invention, there is further provided a signal processing system including$ a linear equalization means for linearly equalizing an input continuous signal, and outputting time series linearly equalized signal; an intersymbol interference data holding means having a memory which stores intersymbol interference among bits in the case of a reproduction of reference source signal as a predetermined plurality of intersymbol interference data; a first ternary discrimination means discriminating the ternary values of the linearly equalized signal and producing a first discrimination result; a first partial response class IV decoding means for decoding the discriminated value of the ternary discrimination means by the partial response class IV method, and producing an address for reading out the intersymbol interference data stored in the intersymbol interference data holding means; a delay means for delaying the linearly equalized signal by a predetermined time and producing a delayed linearly equalized signal; a subtraction means for subtracting from the delayed linearly equalized signal the intersymbol interference data read out from the intersymbol interference data holding means; a second ternary discrimination means for discriminating the ternaryvalues of the subtraction results; a second partial response class IV decoding means for decoding the ternary discriminated values by the partial response class IV method, and reproducing a digital signal; and an intersymbol interference data updating means for producing new intersymbol interference data by using the delayed linearly equalized signal and the target value, and updating the intersymbol interference data held in the intersymbol interference data holding means using the produced intersymbol interference data, by an address which is the output data of the second partial response class IV decoding means.

According to the present invention there is provided a signal processing method, including the steps of; recording in a memory means intersymbol interference among bits in the case of reproduction of a reference source signal to a digital signal as a predetermined plurality of intersymbol interference data; linearly equalizing an input continuous source signal; cancelling the intersymbol interference included in the linearly equalized signal using the intersymbol interference data; decoding from the data from which the intersymbol interference was cancelled the time series digital data corresponding to the input source signal; producing new intersymbol interference data using at least the linearly equalized signal; and using as an address the decoded digital data and updating the corresponding intersymbol interference data in the memory means with the produced intersymbol interference data.

According to the resent invention, there is also provided a signal processing method, including the steps of; recording in a memory means intersymbol interference among bits in the case of reproduction of a reference source signal to a digital signal as a predetermined plurality of intersymbol interference data; linearly equalizing an input continuous source signal; discriminating by a multi-state of a binary value or more the linearly equalized signal and producing an address for reading out the intersymbol interference data stored in same memory means; cancelling the intersymbol interference included in the linearly equalized signal using the intersymbol interference data; decoding from the data from which the intersymbol interference was cancelled the time series digital data corresponding to the input source signal; producing new intersymbol interference data using at least the linearly equalized signal; and updating the intersymbol interference data in the memory means designated by the produced address using the produced intersymbol interference data.

According to the present invention, there is further provided a signal processing method, including the steps of; recording in a memory means intersymbol interference among bits in the case of reproduction of a reference source signal to a digital signal as a predetermined plurality of intersymbol interference data; linearly equalizing an input continuous source signal; discriminating by a multi-state of a binary value or more the linearly equalized signal and producing an address for reading out the intersymbol interference data stored in the memory means; cancelling the intersymbol interference included in the linearly equalized signal using the intersymbol interference data; decoding from the data from which the intersymbol interference was cancelled the time series digital data corresponding to the input source signal; monitoring fluctuations of the linearly equalized signal; producing new intersymbol interference data using at least the linearly equalized signal; and using this for the produced address when the fluctuations of the linearly equalized signal monitored are more than a predetermined value, using the decoded data as the address when fluctuations in the linearly equalized signal monitored are below a predetermined value, and updating the intersymbol interference data stored in the memory means by the produced intersymbol interference data.

According to the present invention, there is provided a signal processing method, including the steps of; storing in a memory means intersymbol interference among bits in the case of reproduction of a reference source signal to a digital signal as a predetermined plurality of intersymbol interference data; linearly equalizing an input continuous source signal; first decoding of determining from the trends of the linearly equalized signal the most likely first digital signal and its state; producing the address for reading out intersymbol interference data stored in the memory means from the first decoded data; cancelling the intersymbol interference included in the linearly equalized signal in the linear equalization means using intersymbol interference data; and second decoding of determining from the time trends of the cancelled output data the most likely second digital signal and its second state and outputting the second digital signal as the reproduced discriminated signal.

BRIEF DESCRIPTION OF THE DRAWINGS

The above objects and features and other objects and features of the present invention will be described in more detail with reference to the accompanying drawings, in which:

FIG. 10 is a view showing an example of the relationship of three-state provisional discrimination data B[k], a PR-IV decoded provisional discrimination value A[k], and a (2n+2) bit address {A} taking as an example n=3 in the fourth embodiment of the present invention;

DESCRIPTION OF THE PREFERRED EMBODIMENTS

A first embodiment of the present invention will be described with reference to FIG. 2 to FIG. 4.

Figure 1:
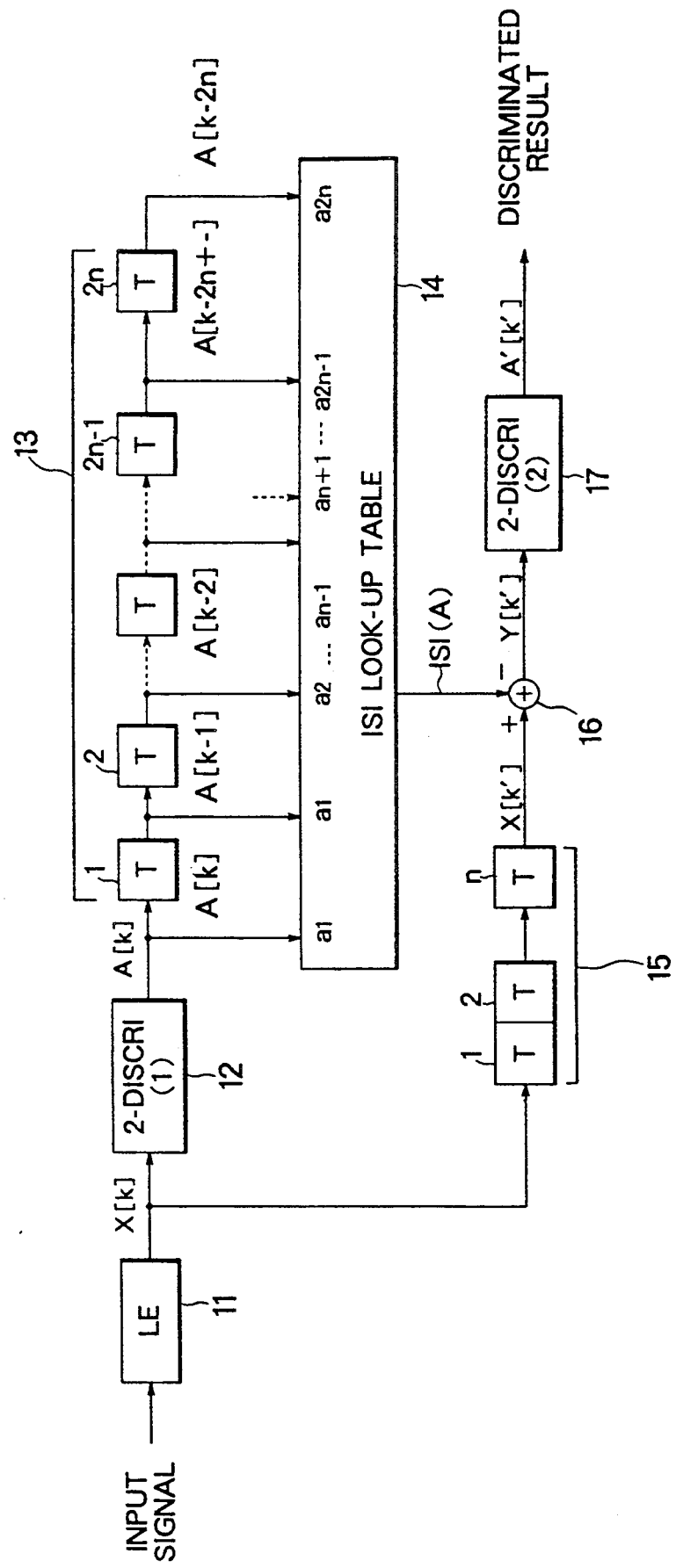
FIG. 1 is a view showing the construction of a reproduction equalizer.
Figure 2:
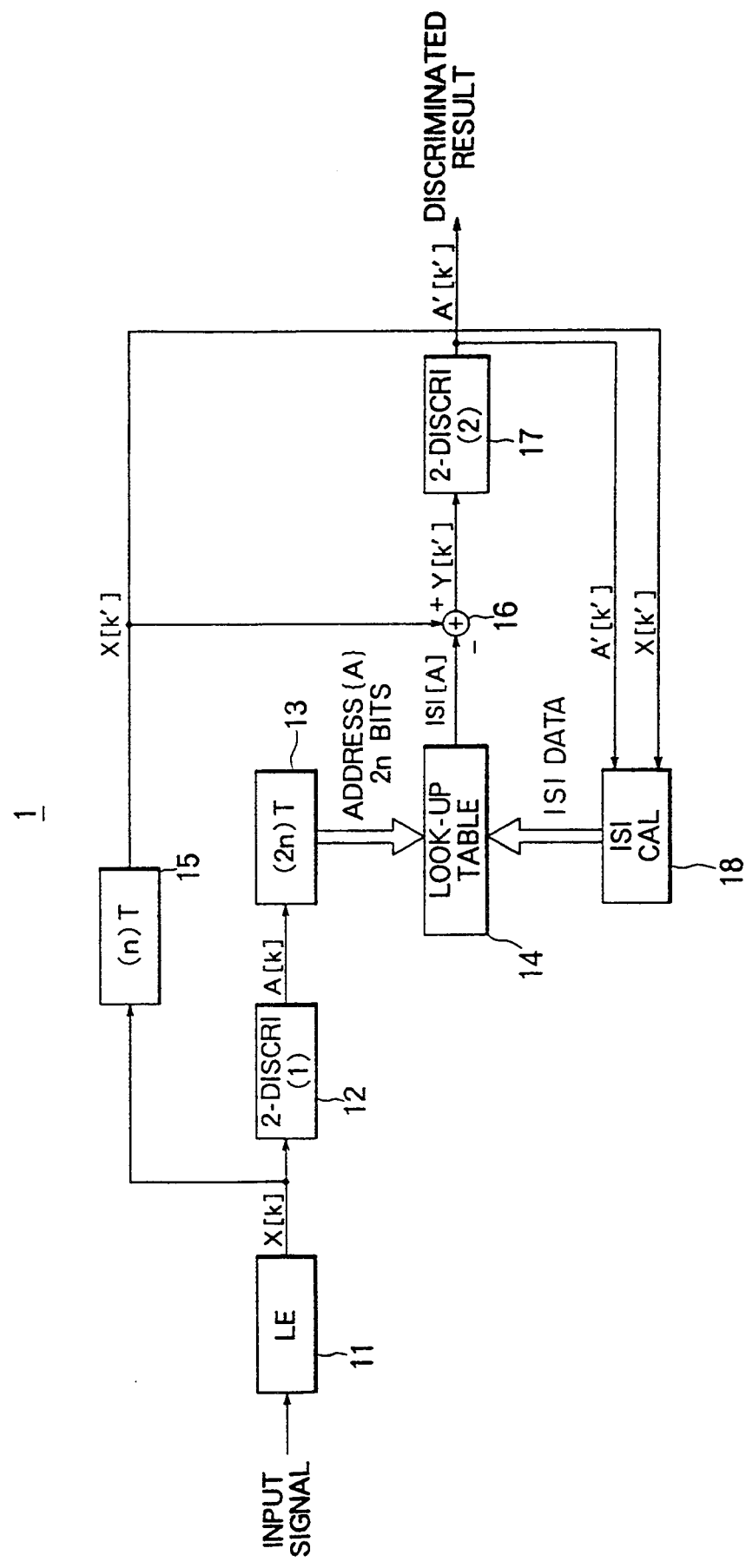
FIG. 2 is a view showing the construction of a reproduction equalizer of a first embodiment in accordance with the present invention.

FIG. 2 is a view showing the construction of a reproduction equalizer 1 of the present invention, which can be applied in a digital VTR. The reproduction equalizer I includes a linear equalizer 11, a first binary discriminator 12, a first delay line 13 formed by 2n unit time delaying elements, an ISI lookup table 14 storing intersymbol-interference (ISI) data ISI{A}, a second delay line 15 formed by n unit time delaying elements, a subtractor (a computation circuit) 16, and a second binary discriminator 17. The reproduction equalizer I further includes an ISI calculation circuit 18. The circuits 11 to 17 are substantially identical to those in FIG. 1. Thus, the reproduction equalizer 1 is comprised of the reproduction equalizer 7 of FIG. 1 plus the ISI calculation circuit 18. The ISI calculation circuit 18 has the function of calculating and updating the ISI data from the linearly equalized and delayed analog data $X[k']$ of the linear equalizer 11 after passing through the n-stage second delay line 15 and the final discrimination data $A'[k']$.

The linear equalizer 11 is comprised of an analog filter etc. and shapes the waveform of the source analog signal, which is read from a magnetic tape, for example, as an input signal. The first binary discriminator 12 discriminates the data $X[k]$ output from the linear equalizer 11 to provide the provisional discrimination data $A[k]$. The 2n-stage delay line 13 delays the data $A[k]$ by 2n unit times and produces an address {A} of 2n bits for the lookup table 14. The lookup table 14 is formed by a memory circuit which is comprised of a RAM and its peripheral circuits and stores the ISI data ISI[A]. The n-stage delay line 15 delays the data $X[k]$ output from the linear equalizer 11 and applies it to the computation circuit 16 and the ISI calculation circuit 18. The computation circuit 16 subtracts the ISI data ISI[A], of the address{A} output from the lookup table 14, from the delayed equalized data $X[k']$ output from the n-stage delay line 15. A second binary discriminator 17 discriminates the data $Y[k']$ output from the computation circuit 16 and outputs the final discrimination data $A'[k']$.

The reproduction equalizer 1 includes the linear equalizer 11 as a linear equalization means, a nonlinear equalization means consisting of the first binary discriminator 12, the first delay line 13, the ISI lookup table 14, the second delay line 15, the computation circuit 16, and the ISI calculation circuit 18, and the second binary discriminator 17 as a discrimination means. In the nonlinear equalization means, the first binary discriminator 12 and the first delay line 13 function as an address generation means, and the second delay line 15 functions as a timing adjustment means. The meaning of the signals and symbols k, k', $X[k]$, $X[k']$, $A[k]$, $A'[k']$, ISI[A], and $Y[k']$ are summarized in the above Table 1.

Figure 3:
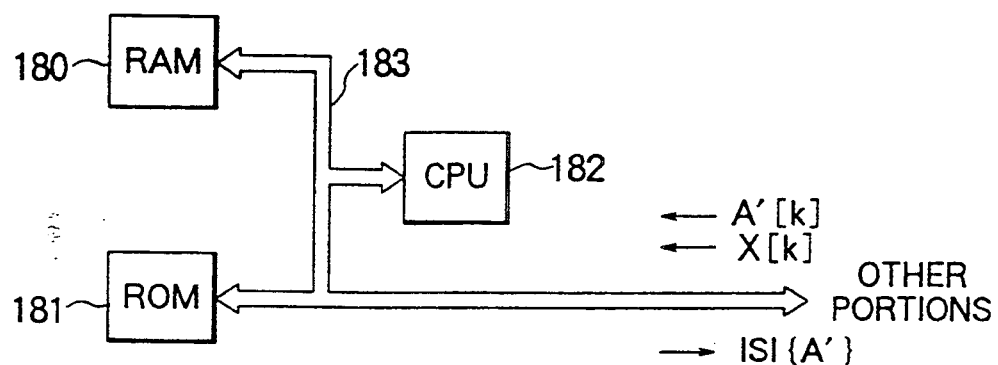
FIG 3 is a view showing the construction of an ISI calculation circuit included in the reproduction equalizer shown in FIG. 2.

FIG. 3 is a view showing the construction of the ISI calculation circuit 18. The circuit 18 consists of a RAM 180, a ROM 181, a CPU 182, and a bus 183. The RAM 180 stores temporary ISI data ISI{A'} and the number of times N{A'} of generation of the address {A'}. The ROM 181 stores programs for calculating the temporary ISI data LISI{A'}, the address generation data N{A'}, and the ISI data ISI{A'}. The CPU 182 carries out the actual calculation on the basis of programs stored in the ROM 181.

An explanation will be made of the method of calculation of the ISI data in the ISI calculation circuit 18 with reference to the flow chart of FIG. 4.

First, at steps S01 to S04, all the ISI data ISI{A'}, the temporary ISI values LISI{A'}, and the number of times N{A'} of generation of the address {A'} in the RAM 180 are initialized (cleared) to zero for all addresses {A'}. That is,

ISI{A'}=0
LISI{A'}=0
N{A'}=0

Here, the address determined by the 2n number of discrimination data A' [j] (j=k', k'−1, ..., k'−2n) except for the discrimination data A'[k'−n] is used as the address {A'} and differentiated from the address {A} determined by the 2n number of provisional discrimination data A[i] (i=k, k−1, ..., k−2n) except the provisional discrimination data A [k']. For convenience of explanation, the amplitude of the linearly equalized data $X[k]$ of the linear equalizer 11 is normalized between −1 and +1 and discriminated as 1 and 0 with the threshold of 0. If the target value $B'[k]=1$ is made to correspond to the discrimination value $A'[k]=1$ and the target value $B'[k]=−1$ is made to correspond to the discrimination value $A'[k]=0$, then the target value $B'[k]=\pm1$ becomes the target value of the linearly equalized data $X[k]$ of the linear equalizer 11, so $(X[k]−B'[k])$ becomes the ISI value ISI{A'} at a certain instant k.

At steps S05 to S07, when a new final discrimination data $A'[k']$ is obtained, the difference between the provisional discrimination data $X[k'−n]$ and the target value $B'[k'−n]$ is added as the ISI data ISI{A'} at a certain instant (k'−n) to the temporary ISI data LISI{A'} of the corresponding address {A'}, and the number of times N{A'} of generation of the address {A'} is increased by one. That is, the contents stored in the RAM 180 are updated in the manner of $$LISI\{A'\}=LISI\{A'\}+(X[k'-n]-B'[k'-n])$$
$$N\{A'\}=N\{A'\}+1$$

Next, at steps S07 to S09, when the temporary ISI data LISI{A'} of a certain address is added a number a times M set in advance, the provisional ISI data ISI{A'} is divided by the number of times M of addition of the address to calculate the average value of the temporary ISI data LISI{A'}, the data LISI{A'} and the ISI data ISI{A'} stored in the RAM 180 are added and the average value obtained, the resultant value is newly stored into the RAM 180, and the number of times N{A'} of generation of the address {A'} is cleared to zero. That is, the contents stored in the RAM 180 are changed in the manner of $$ISI\{A'\} = \frac{ISI\{A'\}}{2} + \frac{LISI\{A'\}}{2M}$$

$$N\{A'\} = 0$$

Here, the average value of the temporary ISI data LISI{A'} and the value of the ISI data ISI{A'} in the RAM 180 are added by the same ratio of 0.5:0.5 to obtain the average, but the ratio may be any one so long as $\alpha:(1-\alpha)$. Then, the ISI data IsI{A'} is obtained by the following formula:

$$ISI\{A'\} = \frac{ISI\{A'\}}{\alpha} + \frac{LISI\{A'\}}{(1-\alpha)M}$$

Further, when the speed of operation of the RAM 180 is slow and the reading and writing of the ISI data ISI{A'} are not possible in a single clock interval, the temporary ISI value LISI{A'} and the number of times N{A'} of generation of the address {A'} are updated only in the period when a rotation head (not shown) of the digital VTR and the magnetic tape (not shown) are in contact. It is sufficient to update the ISI data ISI{A'} and write it in the RAM 180 while the head and tape are not in contact.

With the above-mentioned extremely simple calculation, it is possible to automatically produce the necessary ISI data ISI{A'}.

Note that in the beginning all the ISI data ISI{A'} is zero, so the same thing as the provisional discrimination data A[k] produced by the linear equalizer 11 is output for the final discrimination data A'[k]. Therefore, it is not possible to obtain the effect of the first reproduction equalizer i until the ISI data ISI{A'} is updated several times. Also, when a large number of errors are included in the original reproduction data as the input signal, in other words, the provisional discrimination data A[k] produced by the linear equalizer 11, it is not possible to read out the suitable ISI data ISI{A'} and eliminate the same, so use of a linear equalizer 11 adjusted well to a certain degree is necessary for the first reproduction equalizer 1. However, this does not become a new defect caused by the present invention. Rather, the merit is greater from the lack of need for initialization. It goes without saying that when there is previous ISI data, that may be used as the initial value of the ISI{A'}.

The ISI data ISI{A'} obtained by the above-mentioned method by the ISI calculation circuit 18 is used in the first reproduction equalizer i for discrimination of the reproduction signal by a method the same as explained with reference to the reproduction equalizer 7 in FIG. 1. Namely, the generated ISI data ISI{A'} is subtracted from the linearly equalized and delayed data X[k'] at the computation circuit 16 to cancel the ISI contained in the data X[k'], and ISI free analog data Y[k'] is discriminated at the second discriminator 17 to provide the final discrimination data A'[k'] with a high accuracy. The final discrimination data A'[k'] may be used for updating the ISI data ISI{A'} in the ISI calculation circuit 18.

As will be clearly appreciated from the above description, strictly speaking, on one hand, the RAM 180 is used as the ISI lookup table 14 and, on other hand, the RAM 180 functions as a memory for temporarily storing the data ISI{A'}, LISI{A'}, and N{A'}. The RAM 180, the ROM 181, the CPU 182, and the bus 183 function as the ISI calculation circuit 18 and the ISI lookup table The method of production of the ISI data ISI{A'} by the ISI calculation circuit 18 explained in the first embodiment is used as the basic method of ISI generation. In this basic method, use is made of the result of the ISI free analog data Y[k'] of the computation circuit 16 after subtraction of the ISI data ISI{A'}, that is, the final discrimination data A'[k'], to calculate the ISI data ISI{A'} at a certain instant k'. Further, the 2n bit address {A} is determined by the 2n number of discrimination values A'[j] (j=k', k'−1, ... k'−2n) except the discrimination value A'[k'−n] to produce the ISI data ISI{A'} which is then stored into the lookup table 14. The ISI data ISI{A'} of the 2n bit address {A}, designated by the 2n number of provisional discrimination data A[i] (i=k, k−1, ..., k−2n) except the provisional discrimination data A[k'], is read out and subtracted from the signal X[k'].

A second embodiment of the present invention will be described with reference to FIG. 5 to FIG. 7. The method of determination of the ISI data in the second embodiment explained below is a modification of the above basic method.

Figure 5:
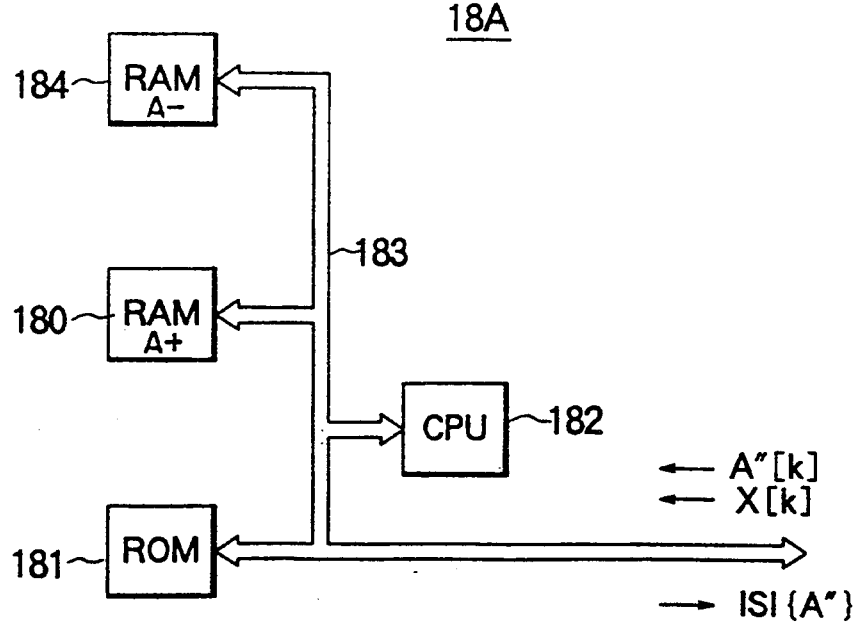
FIG. 5 is a view showing the construction of another ISI calculation circuit, modified from the ISI calculation circuit shown in FIG. 3, as a second embodiment of the present invention.

The ISI calculation circuit 18 and the ISI lookup table 14 are formed by the RAM 180, the ROM 181, the CPU 182, the bus 183, and an additional RAM 184, as shown in FIG. 5. The RAMs 180 and 184 store first ISI data ISI{A+} and second ISI data ISI{A−} and operate in parallel.

Figure 4:
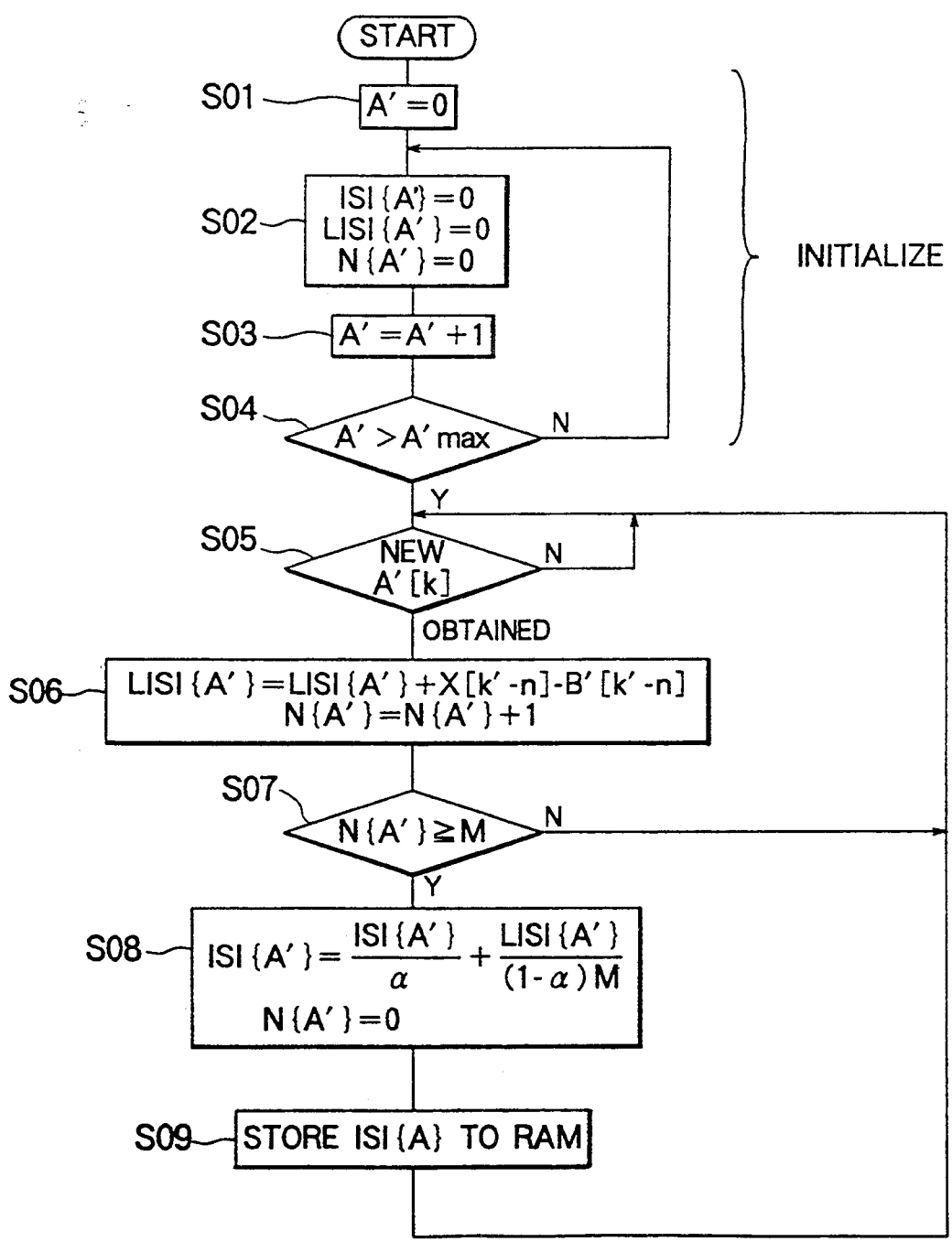
FIG. 4 is a flow chart explaining the initialization and updating of ISI data in the ISI calculation circuit shown in FIGS. 3.
Figure 6:
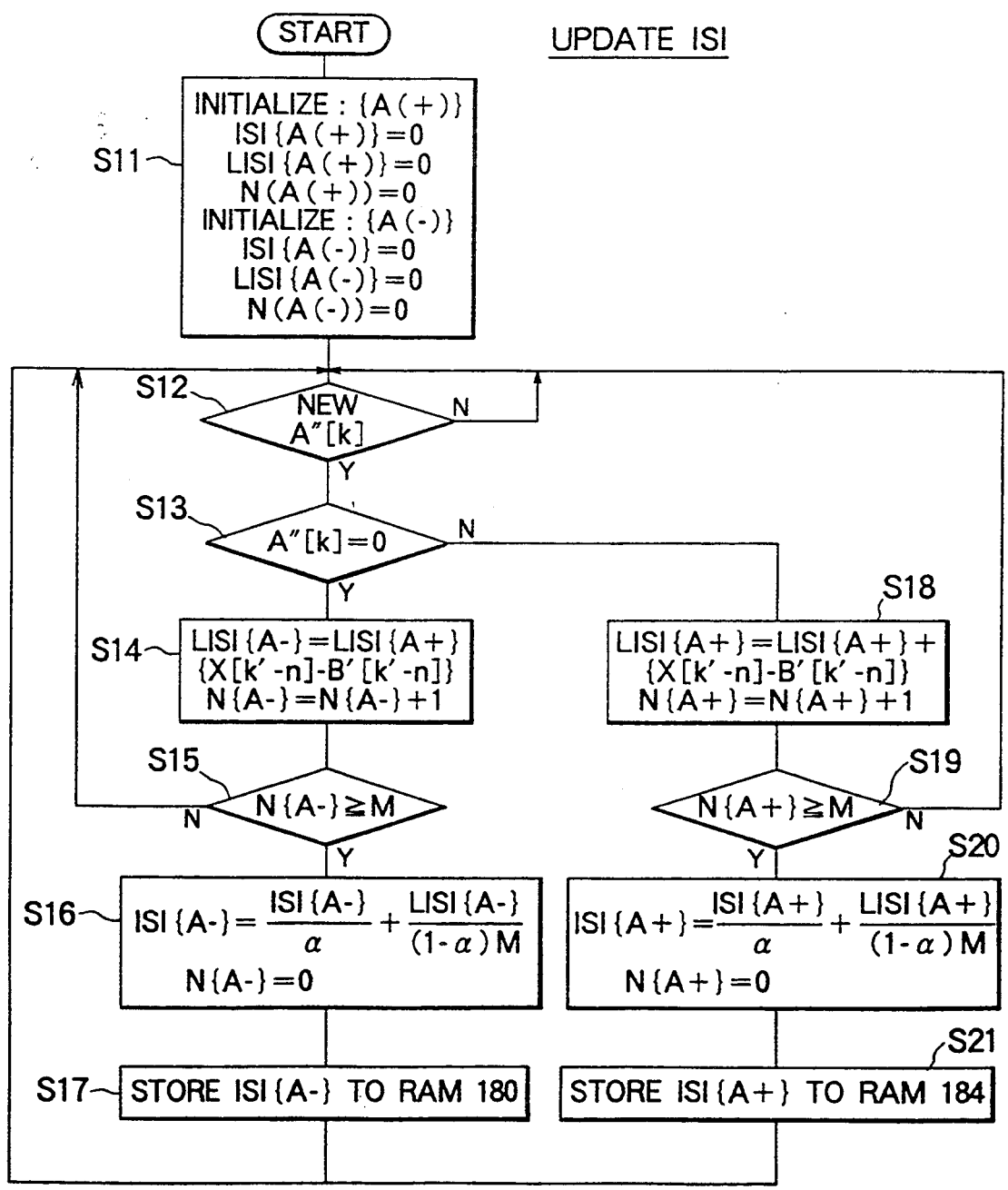
FIG. 6 is a flow chart explaining the initialization and updating of ISI data in the ISI calculation circuit shown in FIG. 5.

In FIG. 6, at step S11, the CPU 182 initializes the data in the RAMs 180 and 184 in the same way as the initialization at steps S01 to S04 in FIG. 4. When a new final discrimination data A"[k] is obtained at the second discriminator 17 (step S12), the CPU 182 determines whether or not the data A"[k] is zero (step S13) and calculates the ISI data ISI{A+} (steps S14 to S17) or the ISI data ISI{A−} (steps S18 to S21). Namely, the (2n+1) bit address {A'} is determined by the (2n+1) number of final discrimination data A'[j] (j=k', k'−1, ..., k'−2n) except the final discrimination data A'[k'−n] to produce the ISI data which is then written into the lookup table 14.

Figure 7:
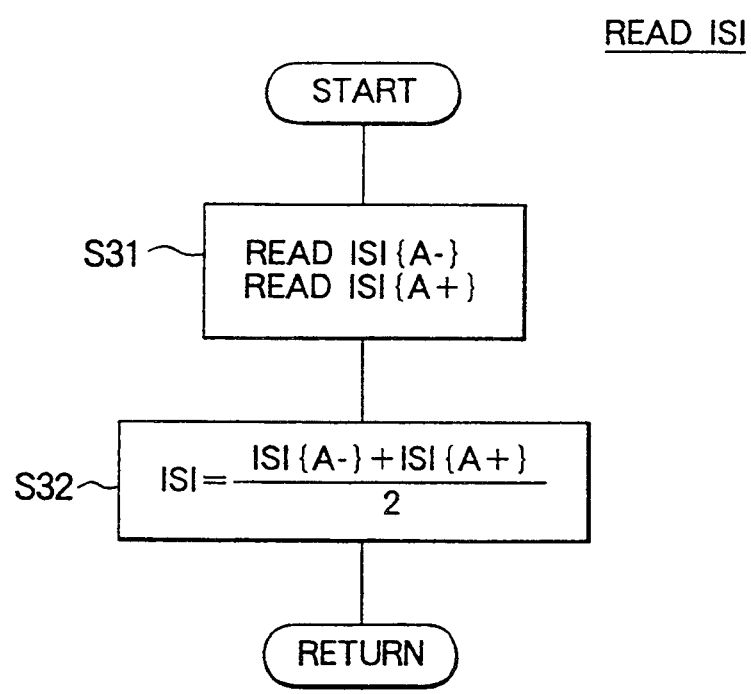
FIG. 7 is a flow chart explaining the reading of the ISI data in the ISI calculation circuit shown in FIG. 6.

In FIG. 7, when reading this out, two sets of data, the ISI data ISI{A+} when the provisional discrimination data A[k']=1 in the case of provisional discrimination data A[i] (i=k, k−1, ..., k−2n) except the provisional discrimination data A[k'] and the ISI data ISI{A−} when the provisional discrimination data A[k']=0, are simultaneously read out. The two ISI data ISI{A+} and ISI{A−} are averaged and then the result is subtracted from the linearly equalized and delayed data X[k'].

In this case, two RAMs 180 and 184 for storing $2^{2n}$ bits of ISI data ISI{A+} and ISI{A−} are prepared and arranged in parallel. These are used when producing the ISI data in accordance with when the corresponding final discrimination data A'[k'] is "1" or "0". In this method, the size of the circuit becomes larger, but the reliability of the ISI data is improved.

A third embodiment of the present invention will be described with reference to FIG. 8.

Figure 8:
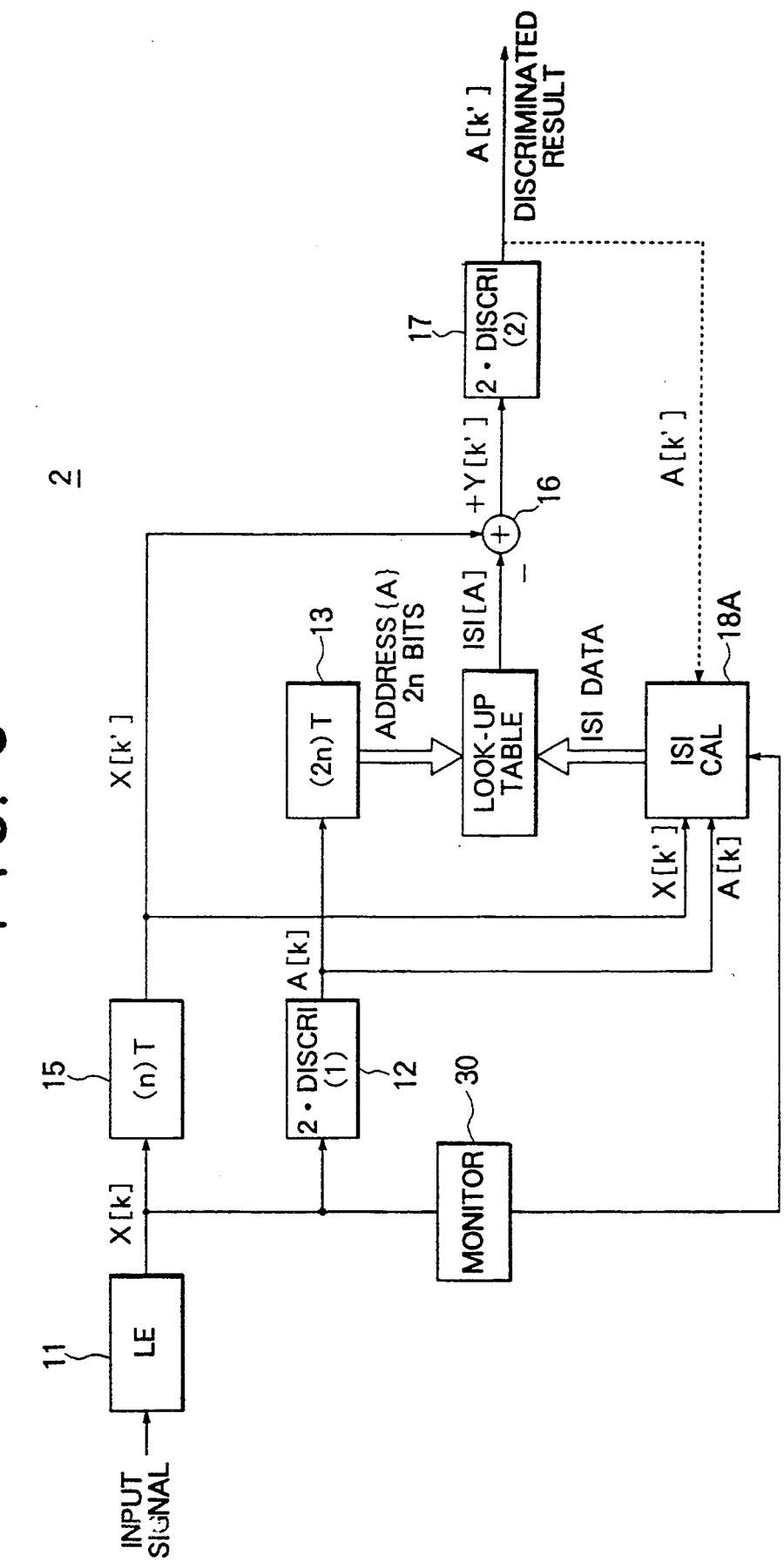
FIG. 8 is a view showing the construction of a reproduction equalizer of a third embodiment in accordance with the present invention.

FIG. 8 is a view showing the construction of a reproduction equalizer 2 of the present invention. The portions of the reproduction equalizer 2 are the same as the portions of the reproduction equalizer 1 given the same references.

In the construction of the reproduction equalizer 1 shown in FIG. 2, use is made of the final discrimination data A'[k'], obtained by discrimination of the ISI free analog data Y[k'] of the computation circuit 16, to produce the ISI data ISi{A'} at the ISI calculation circuit 18. This is, in general, because the final discrimination data A'[k'] of the second binary discriminator 17 is higher in reliability than the provisional discrimination data A[k] of the first binary discriminator 12. However, when there are many faults in the magnetic tape in the VTR or when envelope fluctuations of final discrimination data A'[k'] are large, sometimes the results Y[k'] of output of the nonlinear canceler may become lower in reliability. In such a case, if the ISI data ISI{A'} is produced from the results A'[k'] of discrimination of the ISI free analog data Y[k'] of the computation circuit 16, when the signal Y[k'] of the computation circuit 16 starts to be unsuitable in value, the ISI data ISI{A'} calculated at the ISI calculation circuit 18 may not be converged.

Therefore, in the reproduction equalizer 2, use is made of the provisional discrimination data A[k] which is discriminated from the linearly equalized reproduction data X[k] of the linear equalizer 11, instead of the final discrimination data A'[k'], for the production of the ISI data ISI{A}. The computation of the ISI data in the ISI calculation circuit 18 is the same as that of FIG. 4. For the reproduction equalizer 2 explained above, naturally it is possible to use both of the basic method of the first embodiment and the method of the second embodiment for calculating the ISI data ISI{A'} in the ISI calculation circuit 18.

From the same thinking, the construction of the reproduction equalizer 2 is made similar to that of the reproduction equalizer I shown in FIG. 2.

The envelope of the equalized reproduction data X[k] is constantly monitored at the monitoring means 30, and if the envelope becomes defective, the calculation of the LISI{A'} may be stopped. Further, it is also possible to use an ECC circuit (not shown) which can be provided at a succeeding stage of the reproduction equalizer 2 to sense when the error rate deteriorates and stop the calculation of the LISI{A'} during that period.

Also, instead of stopping the calculation of the LISI{A'}, it is possible to switch the constructions of the reproduction equalizer 1 and the reproduction equalizer 2. Alternatively, both the provisional discrimination data A[k] and the final discrimination data A'[k'] as shown in a dotted line can be input to the ISI calculation circuit 18, and the ISI calculation circuit 18 can calculate the ISI data ISI{A'} by using the provisional discrimination data A[k] and the linearly equalized and delayed data X[k'] when the data X[k] monitored by the monitoring means 30 is not defective, or using the final discrimination data A[k'] and the data X[k'] when the envelope of the data X[k] monitored by the monitoring means 30 is defective.

When the error rate continues to deteriorate, it is effective to clear all the ISI data of the lookup table 14 once.

A fourth embodiment of the present invention will next be described.

In the embodiments explained above, the binary discriminators 12 and 17 are used to discriminate the data as the values of "1" and "0". In the fourth embodiment, the application of the reproduction equalizer 1 and the reproduction equalizer 2 to the partial response class IV (PR-IV) method is considered as an example of application of the reproduction equalizer 1 and the reproduction equalizer 2.

Figure 9:
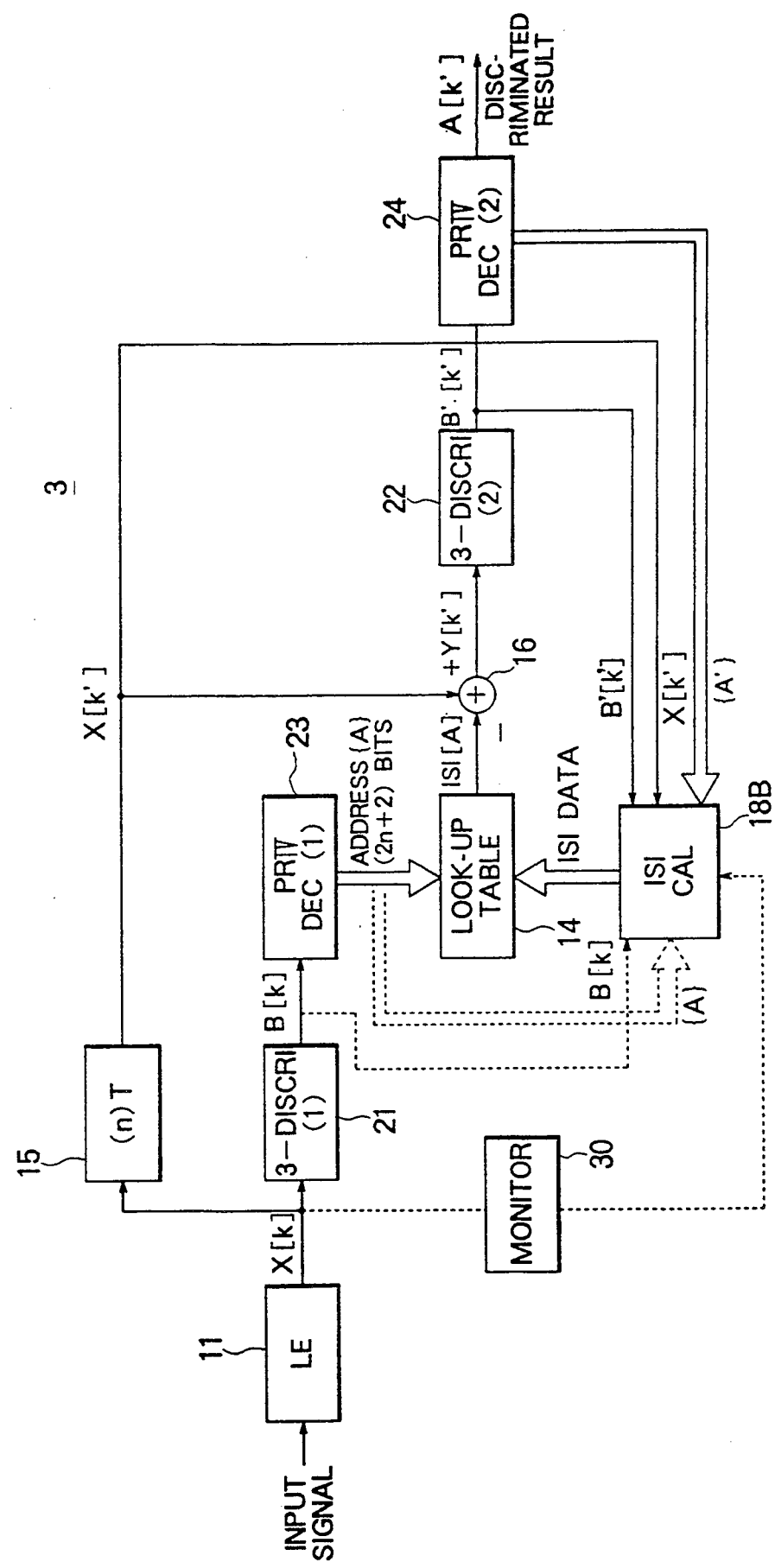
FIG. 9 is a view showing the construction of a reproduction equalizer of a fourth embodiment in accordance with the present invention.

FIG. 9 is a view showing the construction of a reproduction equalizer 3 of the present invention.

A reproduction equalizer 3 includes the linear equalizer 11, a first ternary discriminator 21, a first PR-IV decoder 23, the ISI lookup table 14, the delay line 15, the computation circuit (subtractor) 16, an ISI calculation circuit 18B, a second ternarydiscriminator 22, and a second PR-IV decoder 24. The linear equalizer 11, the ISI lookup table 14, the delay line 15, and the computation circuit 16 are substantially identical to those in FIG. 2. The first ternarydiscriminator 21 and the first PR-IV decoder 23 function as an address generation means and provide an address {A} of (2n+2) bits. The first ternarydiscriminator 21, the first PR-IV decoder 23, the ISI lookup table 14, the delay line 15, and the computation circuit 16 function as a nonlinear canceler.

Table 2 shows the nomenclatures of the signals in FIG. 9.

TABLE 2

| Symbols | Meanings |
| --- | --- |
| k | current time |
| k' | delay time delayed from k by n unit times $k' = k - n$ |
| {A} | address of (2n + 2) bits for the table 14 (RP IV decoded discrimination data) |
| X[k] | linearly equalized data |
| X[k'] | linearly equalized and delayed data |
| B[k] | provisional ternary discrimination data of $(1,0,-1)$ |
| B'[k'] | semi-final ternary discrimination data of $(1,0,-1)$ |
| ISI{A} | intersymbol-interference(ISI) data of address{A} |
| Y[k'] | ISI free analog data |
| A'[k'] | final discrimination data |
| {A'} | address for the ISI calculation circuit |

In a PR-IV method, recording is performed after precoding the recording data by addition of a 2 bit delay (mod2). The linear equalizer 11 is used to equalize the source analog data read from the magnetic tape so that the response of the above data to a unit pulse becomes "1", "0", "$-$"1, the resultant linearly equalized reproduction data X[k] is discriminated as a provisional discrimination data B[k] comprised of "1", "0", or "$-1$" using $\pm 0.5$ as a threshold, and then data of 1 and $-1$ are decoded to 1, and 0 to 0, to thereby produce the provisional discrimination data A [k].

In the first embodiment or the second embodiment, if the address is determined using as is $2n+1$ number of provisional discrimination data B [k] based on the calculation of the ISI data, since the data B[k] has three state values, there are $3^{2n+1}$ combinations. In the case of the PR-IV method, however, it is possible to consider the odd number series and the even number series to be independent NRZIs. Therefore, in addition to the $2^{2n+1}$ combinations after decoding to the binary values 1 and 0, consideration may be given to the NRZI states of the odd number series and the even number series (two states each of 1 or 0). If the non-0 value of the prior odd number bit closest to the bit in question is $-1$, it is considered that (Aodd=0), while if it is 1, it is considered that (Aodd=1). Similarly, if the non-0 value of the prior even number bit closest to the bit in question is $-1$, it is considered that (Aeven=0) and if 1, that (Aeven=1). By the method explained above, there are $2^{3n+9}$ combinations generated by the $(2n+1)$ number of provisional discrimination data. The provisional discrimination data B[k'] is discriminated again, so if this is ignored, the result is a $(2n+2)$ bit address.

FIG. 10 shows an example of the relationship of the provisional discrimination data B[k], the provisional discrimination data A[k], and the (2n+2) bit address {A} taking as an example the case of n=3.

The reproduction equalizer 3 has a construction similar to the reproduction equalizer 1 shown in FIG. 2. To apply the reproduction equalizer i to the PR-IV method, it is necessary to add the first PR-IV decoder 23 for generating the 2n+2bit address {A} from the combination of the provisional discrimination data B[k]

as mentioned above. That is, the reproduction equalizer 3 differs from the reproduction equalizer 1 in that it has the two ternary discriminators 21 and 22 and the two PR-IV decoders 23 and 24. Note that as the target value of the data X[k], the discrimination data B'[k] is used as is.

The first ternary discriminator 21 provisionally discriminates the linearly equalized reproduction data X[k] output from the linear equalizer 11, by three-state threshold data, to provide ternary provisional discrimination data B[k] of (1,0,−1). The second ternary discriminator 22 also discriminates the ISI free data Y[k'] output from the computation circuit 16 by three-state threshold data to provide a semi-final discrimination data B'[k'] of (1,0,−0). The ternary discriminators 21 and 22 discriminate the values of (1, 0, −1) using ±0.5 as a threshold value.

The first PR-IV decoder 23 issues an address {A} from the provisional discrimination data A[k] for reading out the necessary ISI data ISI{A} from the ISI lookup table 14, and then the first PR-IV decoder 23 decodes the provisional discrimination data B[k] output from the first ternarydiscriminator 21 by the PR-IV method to provide the address {A} of (2n+2) bits. The second PR-IV decoder 24 decodes the semi-final discrimination data B'[k'] output from the second ternarydiscriminator 22 by the PRIV method to provide final discrimination data A[k'] of 1 and 0.

The ISI calculation circuit 18B reads the linearly equalized and delayed analog data X[k'], the semi-final discrimination data B'[k'], and the final discrimination data A[k'] as the address{A'} and calculates the ISI data ISI{A'} for the address {A'}.

For this example of application to the PR-IV method too, a combination of the methods of determination of the ISI data explained with reference to the above basic method of the first embodiment, the second embodiment, and the third embodiment is possible. Further, even in a case of application to other than the PR-IV method, one may use the same decoder to convert the discrimination value to an address of the minimum necessary number of bits.

Figure 11:
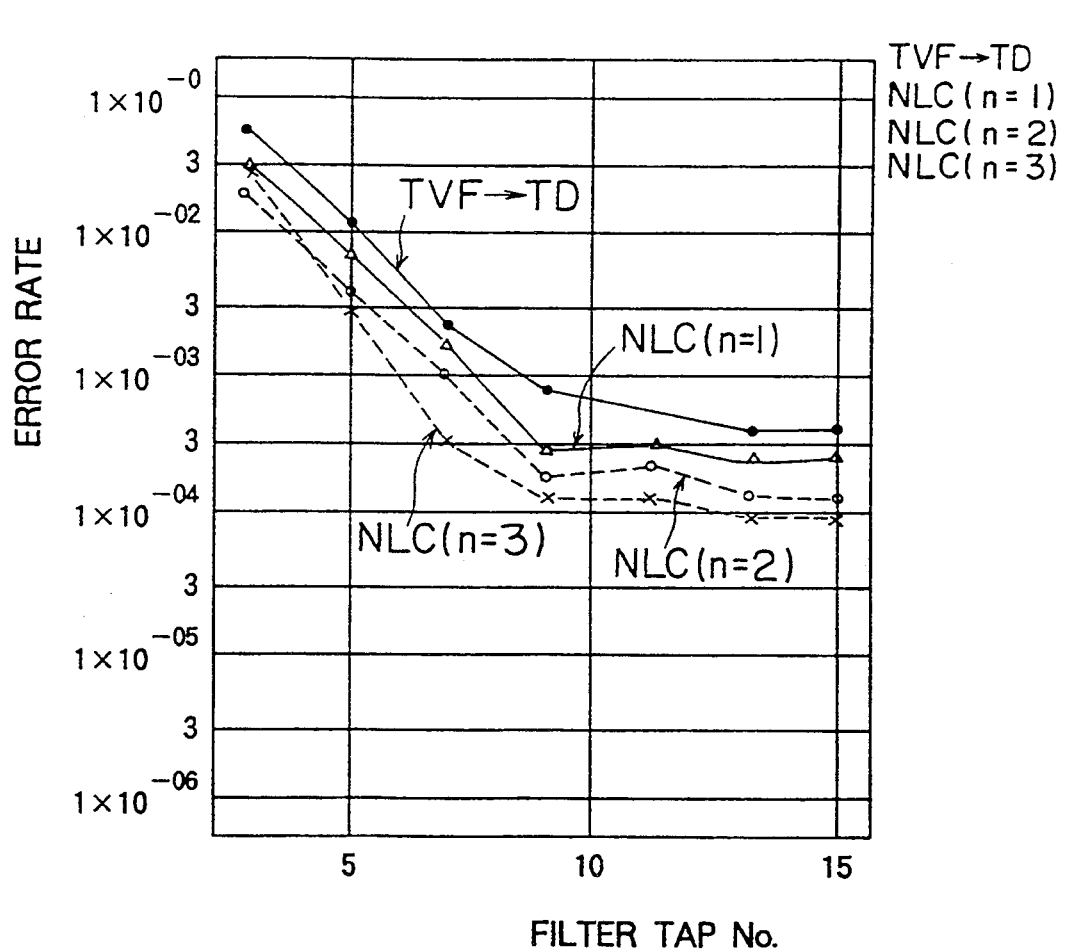
FIG. 11 is a graph showing the error rate when recording a 511 cycle M series in an experimental digital VTR, performing AD conversion of the signal before equalization at a high speed and fetching it into a computer, equalizing to the PR-IV standard by a 3 to 15 tap transversal filter, and comparing the discrimination value with the recording data.

FIG. 11 shows the error rate when recording a 511 cycle M series in an experimental digital VTR, performing analog-to-digital (AD) conversion of the source signal before equalization at a high speed and fetching it into a computer, equalizing to the PR-IV standard by a 3 to 15 tap transversal filter, and comparing the discrimination value with the recording data. The part shown as NLC in FIG. 6 is the result of the application of the reproduction equalizer 3 to the PR-IV method. The number of continuous bits of the source data applied to the linear equalizer 11 is about 20,000. The initial values of the ISI data are all made 0 and updated at M=64. Among them, the greatest improvement in the error rate is obtained in the case of use of the n=3 nonlinear canceler for a 7 tap transversal filter. The error rate is improved from $2.38 \times 10^{-3}$ to $2.46 \times 10^{-4}$, so the error is reduced to about (1/10). The greater the number of taps of the transversal filter, the smaller the equalization error, so the smaller the effect as well, but by using an n=3 linear canceler, the error is reduced to about ($\frac{1}{4}$).

A fifth embodiment of the present invention will be now described.

Figure 12:
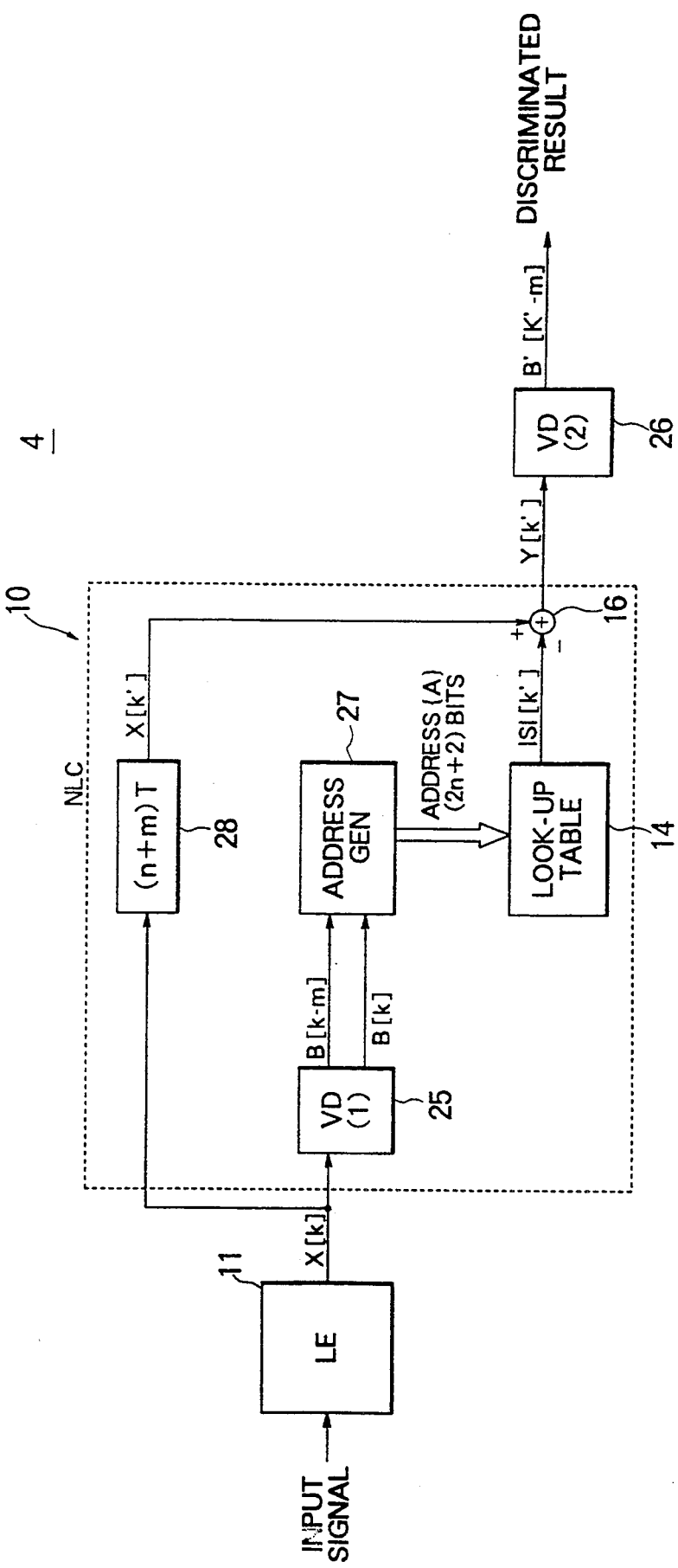
FIG. 12 is a view showing the construction of a reproduction equalizer of a fifth embodiment in accordance with the present invention.

FIG. 12 is a view showing the construction of a reproduction equalizer 4 of the present invention. The reproduction equalizer 4 includes the linear equalizer 11, a first Viterbi decoder (VD(1)) 25, a nonlinear canceler (NLC) 10 consisting of a delay line 28, an address generator 27, the ISI lookup table 14, and the computation circuit (subtractor) 16, and a second Viterbi decoder (VD(2)) 26.

The first Viterbi decoder (VD) 25 decodes and performs provisional discrimination based on the output data X[k] of the linear equalizer 11 and outputs the 1 or 2 binary provisional discrimination data B[k−m] and the state of the NRZI series corresponding to respective instants as the state $\beta[k]$. The second Viterbi decoder (VD) 26 is a PR-IV Viterbi decoder which outputs a 1 or 0 binary discrimination data B'[k'−m] based on the ISI free data Y[k'] after the subtraction of the ISI data ISI(k') at the computation circuit 16.

Below, the symbols shown by $\beta[k]$, $\beta[k-m]$, $\beta[k-m-n-2]$, etc. indicate the state of a series corresponding to PR IV, while m indicates the number of bits until the results of discrimination are finally decided by the first Viterbi decoder (VD) 25.

The address generator 27 is an address generation circuit which gives a 2n bit combination of the provisional discrimination data $B[i](i=k-m-2n, \ldots k-m$, provided, however, that i does not equal k−n) obtained from the first Viterbi decoder 25, the state $\beta[k-m-n-1]$, and the state $\beta[k-m-n-2]$ as the (2n+2) bit address {A} to the lookup table 14. The (n+m) stage delay line 28 is a delay circuit for delaying the linearly equalized data X[k] by (m+n) operation cycles and outputting the delayed data X[k'].

The portions of the reproduction equalizer 4 not explained here correspond to the portions of the reproduction equalizer 1 given the same references.

Below, an explanation will be made of the operation of the reproduction equalizer 4. The first Viterbi decoder 25 provisionally discriminates the equalized data X[k] of the linear equalizer 11 and outputs the 1 or 0 binary provisional discrimination data B[k−m] and the state of the NRZI corresponding to different instants as the state D[k]. The address generator 27 outputs the (2n+2) bit address {A} consisting of a 2n bit combination of the provisional discrimination data B[i] (i=k−m−2n, . . . , k−m, provided, however, that i does not equal (k−n)) output from the first Viterbi decoder 25, the state $\beta[k-m-n-1]$, and the state $\beta[k-m-n-2]$, to the ISI lookup table 14. The lookup table 14 receiving the address {A} outputs the corresponding ISI data ISI[k'] to the computation circuit 16. The (2n+m) stage delay line 28 delays the equalized reproduction data X[k] by (m+n) operation cycles and inputs the delayed signal X[k'] to the computation circuit 16. Here, k'=k−n−m. The computation circuit 16 subtracts the ISI data ISI[k'] from the delayed data X[k'] and outputs the result Y[k'] to the second Viterbi decoder 26. The second Viterbi decoder 26 decodes the data Y[k'] and outputs the 1 or 0 binary discrimination data B'[k]−m].

The Viterbi decoders 25 and 26 and the address generator 27 used here will be explained in further detail here. In the NLCs mentioned in the first embodiment to the fourth embodiment, a PR-IV decoder is necessary for use for the PR-IV method. However, in this embodiment, the outputs of the Viterbi decoders 25 and 26 are already decoded, and the symbol (sign) when discriminated to be 1 is used for decoding inside the Viterbi decoders 25 and 26 as the state of the NRZI of the even number series or the odd number series. Consequently, by using these Viterbi decoders 25 and 26 for the determination of the address, it is possible to streamline the circuit. The Viterbi decoders 25 and 26 use two NRZI decoding Viterbi decoders in parallel for the even number series and the odd number series, and therefore, these Viterbi decoders 25 and 26 function as Viterbi decoders for the PR-IV method.

Here, the values of the states $\beta$ are used, and these show the states of the series. With a usual Viterbi decoder, just the provisional discrimination data B [k−m] is output and the state $\beta$ is used only internally, but in the Viterbi decoders 25 and 26 of the present invention, the state $\beta$ of the NRZI series corresponding to the instant k is output as the state $\beta[k]$. On the other hand, what is required as the address {A} at a certain instant k is the state of the series just before the provisional discrimination data B[k−m−n] is finally decided. Therefore, the address generator 27 is comprised of an (m+n−1) stage register for delaying the state $\beta[k]$ by (m+n−1) operation cycles and a 2n stage register for storing the provisional discrimination data B[k−m]. The state $\beta[k-m-n-1]$, the state $\beta[k-m-n-2]$, and the provisional discrimination data B[i] (i=k−m−2n, . . . , k-m, provided, however, that i does not equal (k−n)) are combined to produce the address {A}.

A sixth embodiment of the present invention will be next described.

Figure 13:
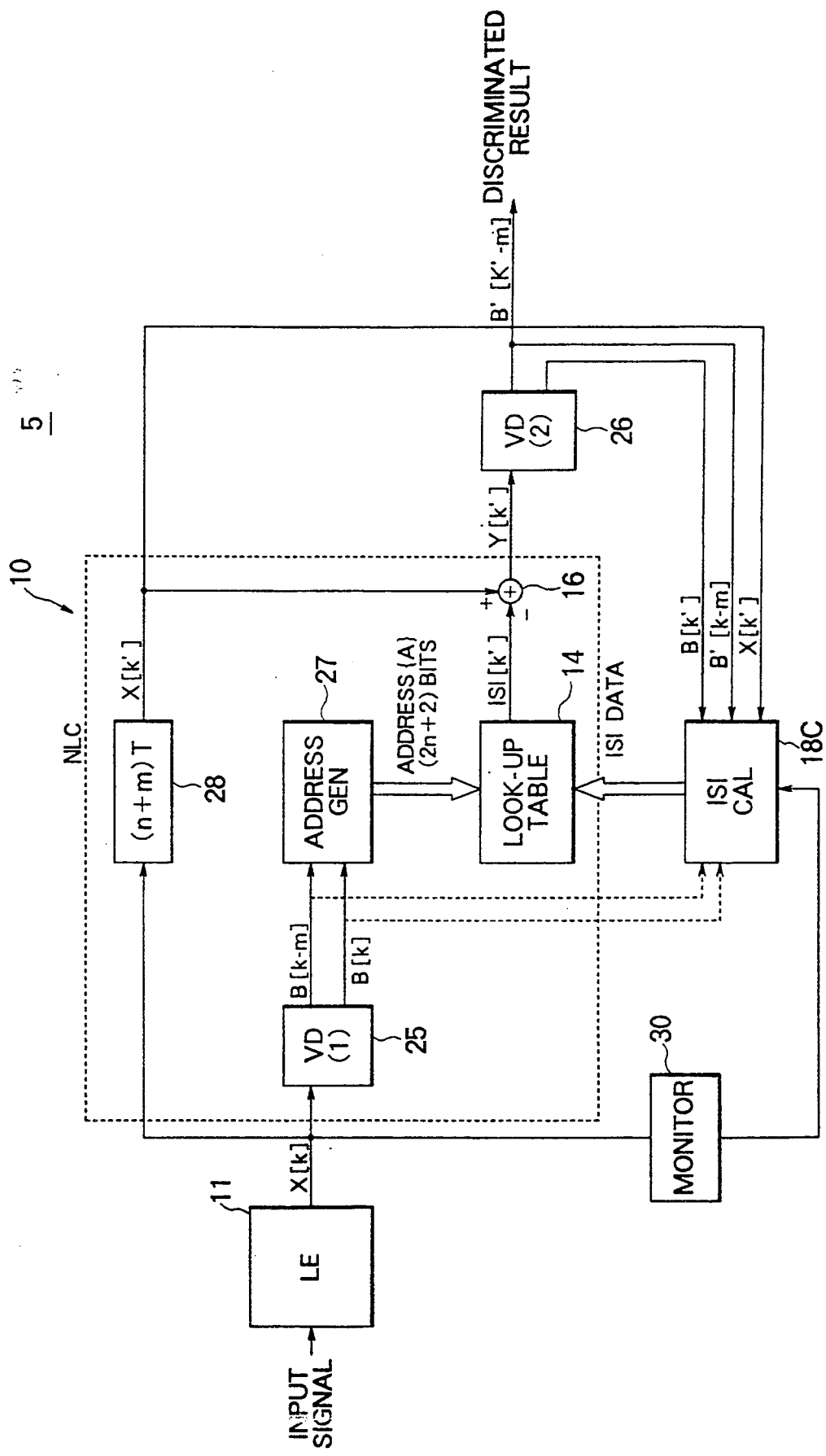
FIG. 13 is a view showing the construction of a reproduction equalizer of a sixth embodiment in accordance with the present invention.

FIG. 13 is a view showing the construction of a reproduction equalizer 5 of the present invention. The reproduction equalizer 5 is comprised of the reproduction equalizer 4 shown in FIG. 12 plus an ISI calculation circuit 18C.

The ISI calculation circuit 18C reads the linearly equalized and delayed data X[k'] output from the (2n+m) stage delay line 28 and the final discrimination data B'[k'−m] and the status $\beta[k']$ output from the second Viterbi decoder 26, delays them by an internal delay to produce delayed data X[k'−n−m], delayed state $\beta[k'-m-n-1]$, delayed state $\beta[k'-m-n-2]$, and delayed discrimination data B'[i] (i=k−m−2n, . . . , k−m). Thereafter, the ISI calculation circuit 18C uses them to calculate the ISI data and updates the calculated ISI data on the ISI lookup table 14 at a suitable time. The ISI calculation circuit 18 used may be any one of the ISI calculation circuits 18, 18A, and 18B explained with reference to the above embodiments.

Other portions of the reproduction equalizer 5 are the same as the portions of the reproduction equalizer given the same references.

By using the construction of the reproduction equalizer 5 shown in FIG. 13, it is possible to realize a bit discriminator which does not require manual setting of the ISI data ISI{k'} to the ISI lookup table 14. Note that in this case, it is necessary to calculate the RAM address as the ISI lookup table 14 inside the ISI calculation circuit 18C, so the state $\beta[k']$ is produced from the second Viterbi decoder 26.

A seventh embodiment of the present invention will be next described.

Figure 14:
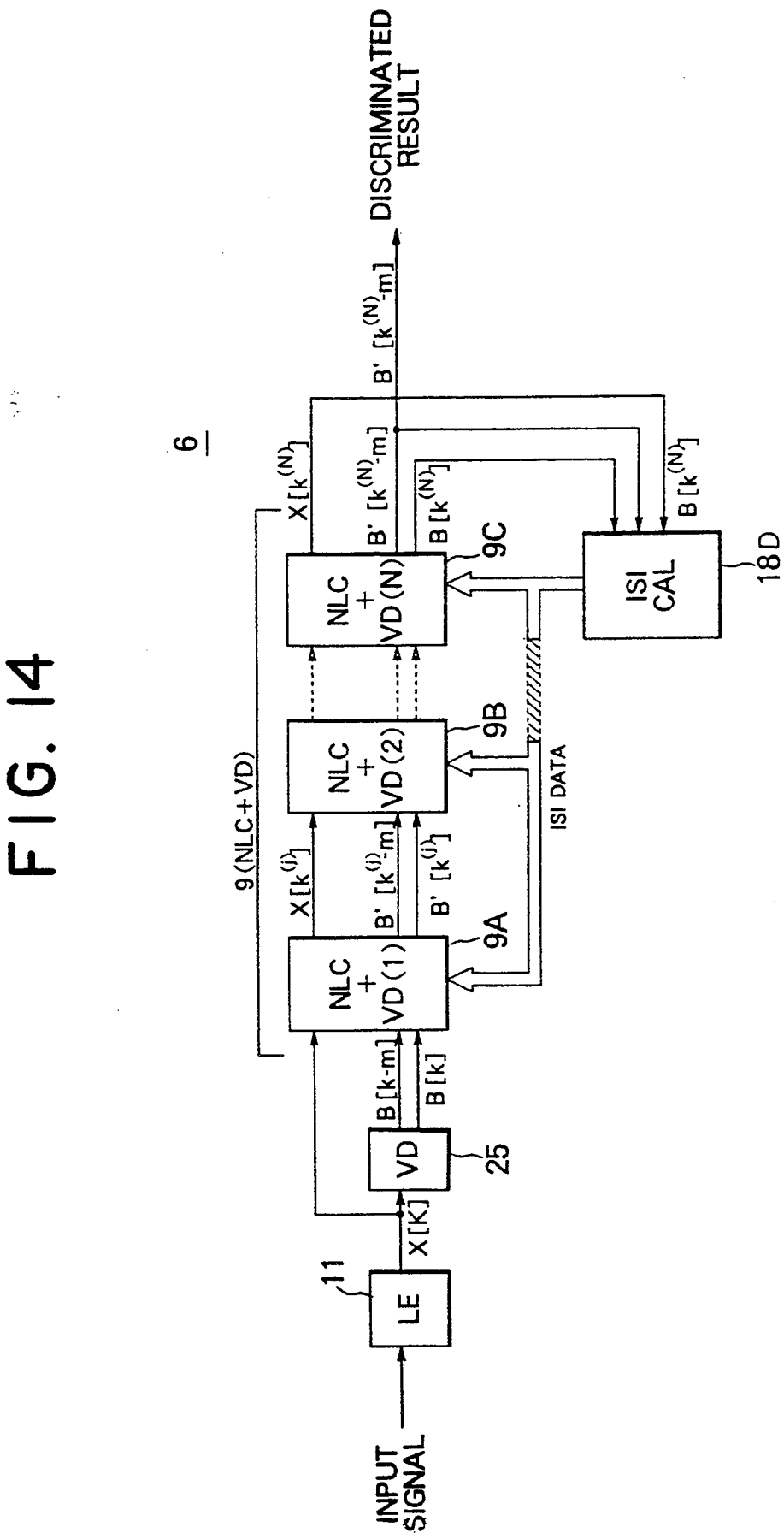
FIG. 14 is a view showing the construction of a reproduction equalizer of a seventh embodiment in accordance with the present invention.

FIG. 14 is a view showing the construction of a reproduction equalizer 6 of the present invention.

The reproduction equalizer 6 includes the linear equalizer 11, the first Viterbi decoder 25, a plurality of unit circuits 9A to 9C connected in series, and an ISI calculation circuit 18D.

Figure 15:
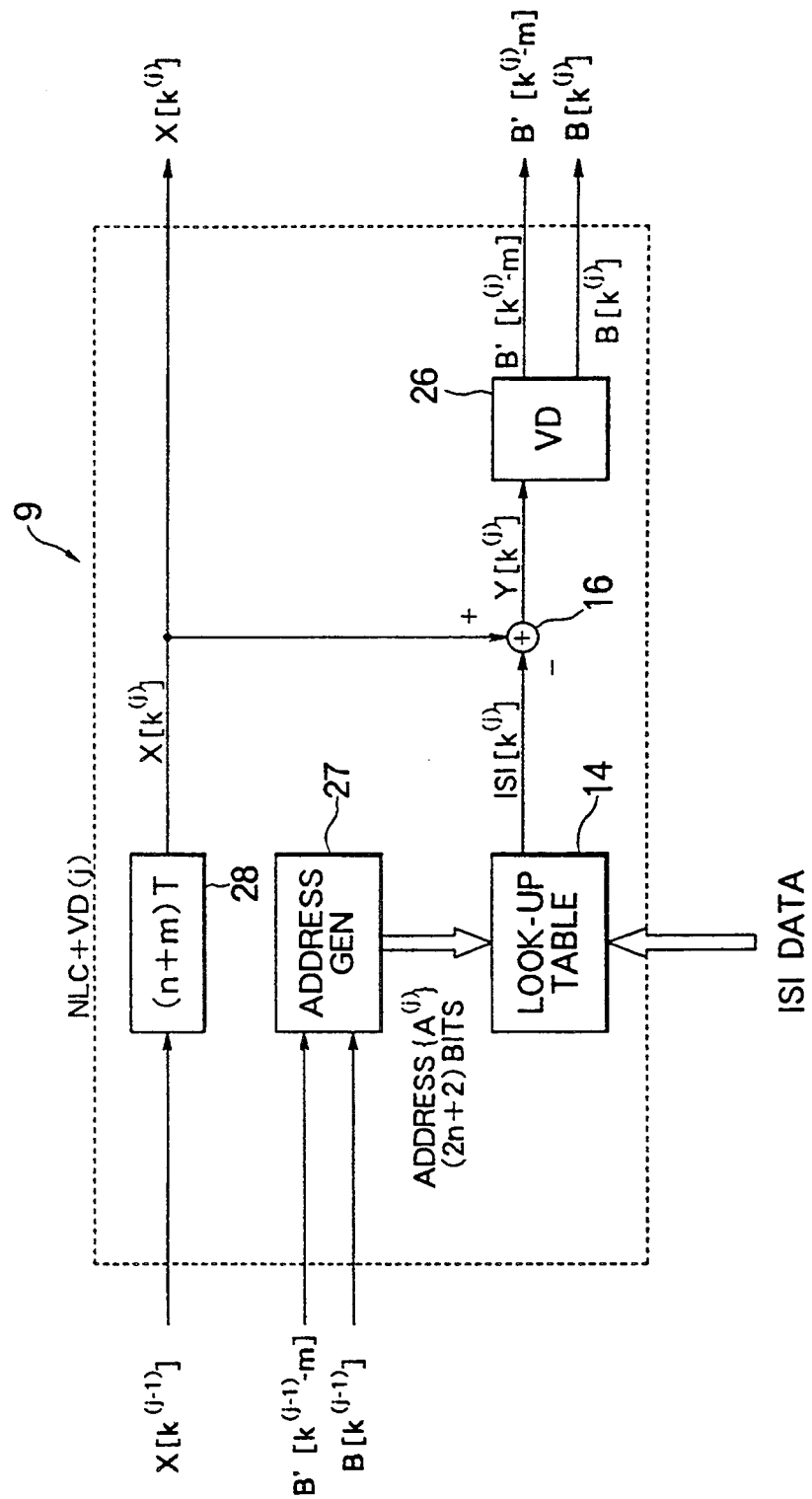
FIG. 15 is a view showing the construction of a component of the reproduction equalizer shown in FIG. 14.

As shown in FIG. 15, each unit circuit 9 includes the (n+m) stage delay line 28, the address generator 27, the ISI lookup table 14, the computation circuit (subtractor) 16, and the second Viterbi decoder 26. The (n+m) stage delay line 28, the address generator 27, the ISI lookup table 14, and the computation circuit 16 form a nonlinear canceler (NLC), and thus, each unit circuit 9 is comprised of the NLC and the second Viterbi decoder 26.

The (n+m) stage delay line 28 in the first unit circuit 9A receives the linearly equalized data X[k] from the linear equalizer 11, delays the same by the (n+m) unit times and applies the delayed linearly equalized data $X[k^{(j)}]$ to the (n+m) stage delay line 28 in the second unit circuit 9B. Also, the address generator 27 in the first unit circuit 9A receives the decoded data B[k−m] and the state $\beta[k]$ from the first Viterbi decoder 25 and generates the address $\{A^{(j)}\}$ of (2n+2) bits for reading the ISI data $ISI[k^{(j)}]$ from the ISI lookup table 14. The second Viterbi decoder 26 in the first unit circuit 9A outputs the decoded data $B'[k^{(j)}-m]$ and the data $\beta[k^{(j)}]$ to the address generator 27 in the second unit circuit 9B. The second Viterbi decoder 26 in the last stage unit circuit 9C outputs the final discrimination data $B'[k^{(N)}-m]$ and the state $\beta[k^{(N)}]$. The last delayed equalized data $X[k^{(N)}]$, the last final discrimination data $B'[k^{(N)}-m]$, and the last state $\beta[k^{(N)}]$, output from the last stage unit circuit 9C, are input to the ISI calculation circuit 18D. The ISI calculation circuit 18D calculates the ISI data on the basis of the data $X[k^{(N)}]$ and $B'[k^{(N)}-m]$ and the state $\beta[k^{(N)}]$ and updates the ISI data in the ISI lookup tables 14 in the unit circuits 9A to 9C.

The signal shown by $X[k^{(j)}]$ indicates the data passing through the (n+m) stage delay line 28 j times, and the signal shown by $B'[k^{(N)}]$ indicates the results of discrimination by the N number of unit circuits (NLC+VD) 9.

In the reproduction equalizer 6, the $X[k-j(n+M)]$ obtained by delaying the equalized reproduction data after linear equalization and the discrimination data $B'[k-j(n+m)-m]$ obtained by the j-th stage second Viterbi decoder 26 are transferred to the next stage. That is, the reproduction equalizer 6 functions as a PR-IV bit discriminator consisting of the first Viterbi decoder 25, a plurality of unit circuits 9A to 9D connected together, and the ISI calculation circuit 18.

In the reproduction equalizer 6, by reading out the ISI data by the higher reliability provisional discrimination data and subtracting the same from the equalized reproduction data, it is possible to further improve the error rate over the reproduction equalizer 4 and the reproduction equalizer 5. Further, since the ISI data is produced based on the final discrimination data, the reliability of the data itself becomes higher than even the reproduction equalizer 5. Note that the upper limit of the error rate is defined by the S/N of the source data after equalization, so it does not mean that the error rate can be continuously improved by increasing the number of the unit circuits 9A to 9D. If the number of the unit circuits is increased, $(B'[k-j(n+m)-m]=B'[k-(j+1)(n+m)-m])$ will result and saturation will occur. Therefore, it is sufficient if two to three of the above-mentioned unit circuits are used.

Figure 16:
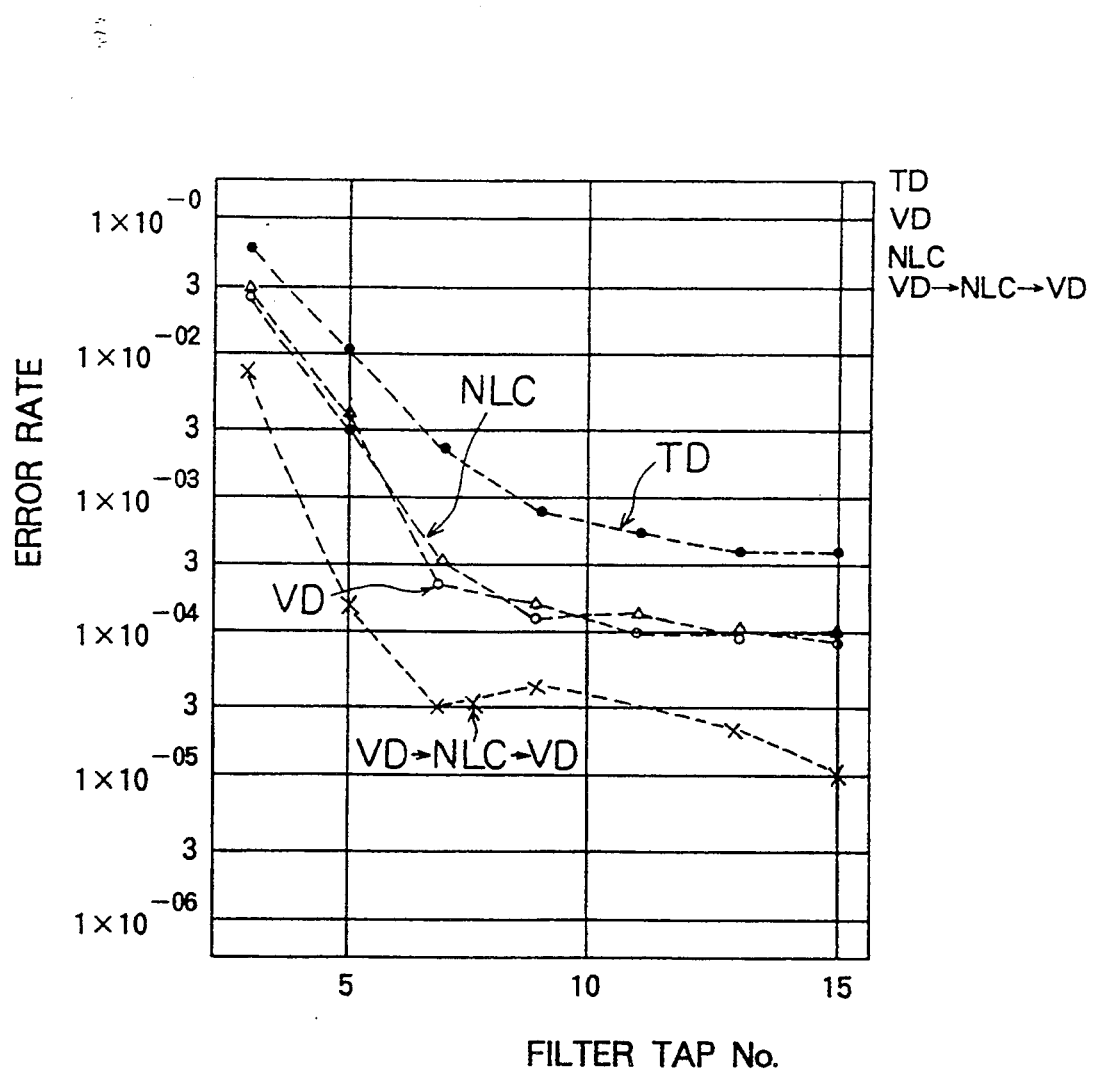
FIG. 16 is a graph showing the error rate when recording a 511 cycle M series in an experimental digital VTR, performing AD conversion of the signal before equalization at a high speed and fetching it into a computer, equalizing to the PR-IV standard by a 3 to 15 tap transversal filter, and comparing the discrimination value with the recording data.

FIG. 16 is a graph showing the error rate when recording a 511 cycle M series in an experimental digital VTR, performing AD conversion of the source data before equalization at a high speed and fetching it into a computer, equalizing to the PR-IV standard by a 3 to 15 tap transversal filter, and comparing the discrimination value with the recording data. There are approximately 2000 bits of continuous source data read from the magnetic tape, for example. This corresponds to one track of an experimental digital VTR. As the NLC, use is made of one with n=3. The initial values of the ISI data are all made 0 and are automatically updated along with the progress in the discrimination. In FIG. 16, "TD" shows the results of the threshold detection. The results of the use of the bit discriminator corresponding to the reproduction equalizer 5 are shown by VD→NLC→VD. The greater improvement in the error rate among these is in the case of the use of the present invention for a 7 tap transversal filter. Compared with 1/100 of the TD, a single VD, and an NLC, the error rate is reduced to about 1/10.

As described above with reference to FIG. 8, the monitoring means 30 for monitoring the envelope of the linearly equalized data X[k] can be provided in the reproduction equalizers 3, 5 and 6 shown in FIGS. 9, 13, and 14. The ISI calculation circuit 18B in FIG. 9 reads the ternary discrimination data B[k] and B'[k] from the first and second ternary discriminators 21 and 22, the addresses {A} and {A'} from the first and second PR-IV decoders 23 and 24, and the linearized and delayed data X[k'] from the delay unit 15, selects the data B[k] and the address {A} when the data X[k] is not defective or the data B'[k] and the address {A'} when the data X[k] is defective, and calculates and updates the ISI data for the ISI lookup table 14. Also, the ISI calculation circuit 18C in FIG. 13 reads the Viterbi decoded data and state B[k] and $\beta$[k], and B'[k] and $\beta$[k'] from the first and second Viterbi decoders 25 and 26, and the linearized and delayed data X[k'] from the delay unit 15, selects the data B[k] and the state $\beta$[k] when the data X[k] is not defective or the data B'[k] and the state $\beta$[k'] when the data X[k] is defective, and calculates and updates the ISI data for the ISI lookup table 14. Further, the ISI calculation circuit 18D in FIG. 14 reads the Viterbi decoded data and state B[k−m] and $\beta$[k], and, B'[k$^{(N)}$−m] and $\beta$[k$^{(N)}$] from the first Viter decoder 25 and the last stage unit circuit 9C, and the linearized and delayed data X[k'] from the last stage unit circuit 9C, selects the data B[k−m] and the state $\beta$[k] when the data X[k] is not defective or the data B'[k$^{(N)}$−m] and the state $\beta$[k$^{(N)}$] when the data X[k] is defective, and calculates and updates the ISI data for the ISI lookup table 14.

In the above embodiments, reproduction equalizers including nonlinear cancelers for canceling the intersymbol interference were described with reference to application to digital VTRs, but clearly the reproduction equalizers, described as examples of a signal processing system including an ISI lookup type nonlinear cancellation means of the present invention, cannot be limited to application for digital VTRs, in other words, can be applied to a variety of digital signal reproduction systems. Also, the recording medium is not limited to magnetic tape and can be magnetic recording disks, optical recording disks, optical-magnetic recording disks, etc.

As described above with reference to FIGS. 11 and 16, the AD converter can be provided at a stage preceding the linear equalizer 11. In this case, all circuits in the reproduction equalizers 2 to 6 perform digital signal processing. Preferably, the linear equalizer 11 can be formed by a transversal filter consisting of a plurality of unit time delaying elements, a plurality of coefficient multipliers, and an adder.

As explained above, according to the present invention, it is possible to provide a signal processing system including a nonlinear cancellation means of the table lookup type, in which nonlinear cancellation means there is no need for adjustment from the outside, including initialization, consideration can be made of sufficiently long preceding and succeeding bits, changes and variations in the magnetic tape and head in the digital VTR can be compensated for, the error included in the provisional discrimination values can be reduced. Also, there is little propagation of error when error is included in the provisional discrimination values, the intersymbol interference is reduced, the correlation of noise is reduced, and it is possible to promote effective utilization of the signal power. Further, the system can be realized by a simple circuit construction, and an excellent error rate can be obtained.

Many widely different embodiments of the present invention may be constructed without departing from the spirit and scope of the present invention, and it should be understood that the present invention is not restricted to the specific embodiments described above.

What is claim is:

1. A signal processing system, comprising:

linear equalization means for linearly equalizing an input continuous source signal and outputting a linearly equalized signal therefrom;

nonlinear cancellation means including memory means which stores intersymbol interference among bits of digital data from reproduction of a reference source signal as a predetermined plurality of intersymbol interference data, address producing means comprised of first ternary discrimination means which discriminates by ternary said linearly equalized signal output by said linear equalization means and partial response class IV decoding means which decodes a ternary discriminated signal output by said first ternary discrimination means in accordance with partial response class IV rules to produce an address for reading out intersymbol interference data stored in said memory means, timing adjustment means which delays said linearly equalized signal by a delay time exactly until said address is produced by said address producing means, and subtraction means which subtracts from a delayed linearly equalized signal adjusted in timing by said timing adjustment means intersymbol interference data read out from said memory means using said address produced by said address producing means, for cancelling intersymbol interference in said linearly equalized signal by using said intersymbol interference data at said address of said memory means;

decoding means including second ternary discrimination means which discriminates by ternary values data output by said subtraction means and second partial response class IV decoding means which decodes ternary discriminated data output by said second ternary discrimination means in accordance with said partial response class IV rules to produce decoded time series digital data corresponding to said input source signal;

means for monitoring fluctuations of said linearly equalized signal; and intersymbol interference data updating means for producing new intersymbol interference data based on a difference between said delayed linearly equalized signal and said ternary discriminated data output by said second ternary discrimination means, and updating intersymbol interference data stored in said memory means at an update address designated by said digital decoded data output by said second partial response class IV decoding means by using said produced new intersymbol interference data.

2. A signal processing system as set forth in claim 1, wherein said timing adjustment means includes a delay circuit which delays said linearly equalized signal by exactly n unit times, and said address produced by said address producing means is 2n+2 bits.

3. A signal processing system comprising:

linear equalization means for linearly equalizing an input continuous source signal and outputting a linearly equalized signal therefrom;

nonlinear cancellation means including memory means which stores intersymbol interference among bits of digital data from reproduction of a reference source signal as a predetermined plurality of intersymbol interference data, first decoding means which determines from past values of said times series linearly equalized signal a most likely first digital signal and a state thereof, address producing means comprised of address generating means which produces an address for said memory means based on said first digital signal and said state thereof, timing adjustment means which delays said linearly equalized signal by a delay time exactly until said address is produced by said address producing means, and subtraction means which subtracts from a delayed linearly equalized signal adjusted in timing by said timing adjustment means intersymbol interference data read out from said memory means using the address produced by said address producing means, for cancelling intersymbol interference in said linearly equalized signal by using said intersymbol interference data at said address of said memory means;

second decoding means for determining from past values of said subtraction results a most likely second digital signal and a second state to produce decoded time series digital data corresponding to said input source signal;

means for monitoring fluctuations of said linearly equalized signal; and intersymbol interference data updating means for producing new intersymbol interference data based on a difference between said timing adjusted delayed linearly equalized signal and second decoded state output from said second decoding means, and updating intersymbol interference data stored in said memory means at an address designated by said decoded digital data from said second decoding means by using said produced new intersymbol interference data.

4. A signal processing system as set forth in claim 3, wherein said first decoding means comprises first Viterbi decoding means, said second decoding means comprises second Viterbi decoding means, and decoding operation of said first Viterbi decoding means and said second Viterbi decoding means each expends m units of time.

5. A signal processing system as set forth in claim 4, wherein said timing adjustment means comprises a delay circuit which delays said linearly equalized signal by exactly n+m unit times, and said address produced by said address generating means is 2n+2 bits.

6. A signal processing system comprising:

linear equalization means for linearly equalizing an input continuous source signal and outputting a linearly equalized signal therefrom;

nonlinear cancellation means including memory means which stores intersymbol interference among bits of digital data from reproduction of a reference source signal as a predetermined plurality of intersymbol interference data, address producing means including first binary value discrimination means which discriminates by binary values said linearly equalized signal output by said linear equalization means and first delay means which delays a discriminated signal generated by said first binary value discrimination means by a predetermined time to produce an address for said memory means, timing adjustment means for delaying said linearly equalized signal by exactly a time until said address is produced by said address producing means, and subtraction means which subtracts from said delayed linearly equalized signal adjusted in timing by said timing adjustment means intersymbol interference data read out from said memory means using said address produced by said address producing means, for cancelling intersymbol interference in said linearly equalized signal by using said intersymbol interference data at said address of said memory means;

decoding means including second binary value discrimination means which discriminates by binary values data output by said subtraction means and produces decoded binary value discriminated digital data corresponding to said input source signals;

means for monitoring fluctuations of said linearly equalized signal; and intersymbol interference data updating means for producing new intersymbol interference data based on a difference between said delayed linearly equalized signal output by said timing adjustment means and a target value, and using said produced new intersymbol interference data for updating intersymbol interference data stored in said memory means at said address produced by said address producing means in said nonlinear cancellation means when said fluctuations of said linearly equalized signal monitored by said monitoring means are more than a predetermined value, or at an address designated by said decoded binary value discriminated data output by said second binary value discrimination means when said fluctuations in said linearly equalized signal monitored by said monitoring means are below said predetermined value, wherein said memory means in said nonlinear cancellation means and said intersymbol interference data updating means are comprised of single writable and readable memory means and program computation means, said writable and readable memory means functions as temporary storage means of said memory means storing intersymbol interference data for said nonlinear cancellation means and said intersymbol interference data updating means, and said program computation means initializes said plurality of intersymbol interference data in said writable and readable memory means and provisional intersymbol interference data at an initiation stage of said signal processing system, uses said decoded binary value discriminated data as an address for said writable and readable memory means each time said binary value discriminated decoded data is produced by said second binary value discrimination means, calculates said difference between said delayed linearly equalized signal and said target value for said address, and adds said difference to said provisional intersymbol interference data to update said provisional intersymbol interference data, and after updating said provisional intersymbol interference data by exactly a predetermined number of times for said address, uses a sum of a value obtained by dividing said intersymbol interference data at said address in said writable and readable memory means by a first coefficient and a second value obtained by dividing said provisional intersymbol interference data by a second coefficient as said new intersymbol interference data and stores same at said address in said writable and readable memory means.

7. A signal processing system as set forth in claim 6, wherein after said intersymbol interference data is updated for all addresses, said nonlinear cancellation means is validated, and said signal processing system is made to operate.

8. A signal processing system as set forth in claim 7, wherein after said signal processing system is made to operate, each time said decoded binary value discriminated data is produced in said second binary value discrimination means, said difference between said delayed linearly equalized signal and said target value is calculated, said decoded binary value discriminated data is used as said address of said writable and readable memory means, and said difference is added to said provisional intersymbol interference data stored in said writable and readable memory means at said address to update said provisional intersymbol interference data, and wherein after said provisional intersymbol interference data is updated said predetermined number of times, a second sum of a second value obtained by dividing said intersymbol interference data by a third coefficient and a fourth value obtained by dividing said provisional intersymbol interference data by a fourth coefficient is used as said new interference data, and said writable and readable memory means is updated at said address with said new interference data.

9. A signal processing system comprising:

linear equalization means for linearly equalizing an input continuous source signal and outputting a linearly equalized signal therefrom;

nonlinear cancellation means including memory means which stores intersymbol interference among bits of digital data from reproduction of a reference source signal as a predetermined plurality of intersymbol interference data, address producing means including first binary value discrimination means which discriminates by binary values said linearly equalized signal output by said linear equalization means and first delay means which delays a discriminated signal generated by said first binary value discrimination means by a predetermined time to produce an address for said memory means, timing adjustment means for delaying said linearly equalized signal by exactly a time until said address is produced by said address producing means, and subtraction means which subtracts from said delayed linearly equalized signal adjusted in timing by said timing adjustment means intersymbol interference data read out from said memory means using said address produced by said address producing means, for cancelling intersymbol interference in said linearly equalized signal by using said intersymbol interference data at said address of said memory means;

decoding means including second binary value discrimination means which discriminates by binary values data output by said subtraction means and produces decoded binary value discriminated digital data corresponding to said input source signals;.

means for monitoring fluctuations of said linearly equalized signal; and intersymbol interference data updating means for producing new intersymbol interference data based on a difference between said delayed linearly equalized signal output by said timing adjustment means and a target value, and using said produced new intersymbol interference data for updating intersymbol interference data stored in said memory means at said address produced by said address producing means in said nonlinear cancellation means when said fluctuations of said linearly equalized signal monitored by said monitoring means are more than a predetermined value, or at an update address designated by said decoded binary value discriminated data output by said second binary value discrimination means when said fluctuations in said linearly equalized signal monitored by said monitoring means are below said predetermined value, wherein said memory means in said nonlinear cancellation means and said intersymbol interference data updating means are comprised of first and second parallel operable writable and readable memory means which respectively store said intersymbol interference data designated by odd addresses and said intersymbol interference data designated by even addresses, and program computation means, said first and second writable and readable memory means function as said memory means for storing said intersymbol interference data in said nonlinear cancellation means and as temporary storage means for said intersymbol interference data updating means, said program computation means initializes intersymbol interference data in said writable and readable memory means and corresponding provisional intersymbol interference data at an initiation stage of said signal processing system, uses said decoded binary value discriminated data as said update address for said writable and readable memory means each time said decoded binary value discriminated data is produced by said second binary value discrimination means, calculates said difference between said delayed linearly equalized signal and said target value and uses said difference as said address for said first writable and readable memory means when the address is odd and for said second writable and readable memory means when said address is even, and adds said difference to said provisional intersymbol interference data to update said provisional intersymbol interference data, and after updating said provisional intersymbol interference data by exactly a predetermined number of times for said address, uses a sum of a value obtained by dividing said intersymbol interference data by a first coefficient and a second value obtained by dividing said provisional intersymbol interference data by a second coefficient as said new intersymbol interference data, and stores said new intersymbol interference data at said address of said writable and readable memory means.

10. A signal processing system as set forth in claim 9, wherein after said intersymbol interference data are updated for all addresses, said nonlinear cancellation means is validated and said signal processing system is made to operate, and wherein said nonlinear cancellation means reads out a corresponding pair of intersymbol interference data from said first and second writable and readable memory means for an address and uses said pair of intersymbol interference data obtained by averaging said pair of intersymbol interference data to cancel intersymbol interference in said linearly equalized signal.

11. A signal processing system as set forth in claim 10, wherein after said signal processing system is made to operate, each time said decoded binary value discriminated data is produced by said second binary value discrimination means, said decoded binary value discriminated data is used as an address, said difference between said delayed linearly equalized signal and said target value is calculated for said address for said first writable and readable memory means when said address is odd and for said second writable and readable memory means when said address is even, said difference is added to said provisional intersymbol interference data, and said provisional intersymbol interference data is replaced by a result of said adding operation, and wherein after said provisional intersymbol interference data is updated a predetermined second number of times, a second sum of a third value obtained by dividing said intersymbol interference data by a third coefficient and a fourth value obtained by dividing said provisional intersymbol interference data by a fourth coefficient is used as said new intersymbol interference data, and said first and second writable and readable memory means is updated in accordance with if said address is odd or even.

12. A signal processing system comprising:
a linear equalization means for linearly equalizing an input continuous source signal;
a nonlinear cancellation means, having a memory means which stores intersymbol interference among bits in the case of reproduction of a reference source signal to a digital signal as a predetermined plurality of intersymbol interference data, and a first decoding means which determines from the trends of the signal linearly equalized by said linear equalization means the most likely first digital signal and its state, and having a means which produces an address for reading out intersymbol interference data stored in said memory means, for cancelling the intersymbol interference included in the signal linearly equalized in said linear equalization means using said intersymbol interference data; and
a second decoding means for determining the most likely second digital signal and a second state, from the time trends in the output data of said nonlinear cancellation means, and outputting said second digital signal as the reproduced discriminated signal.

13. A signal processing system as set forth in claim 12, wherein said first decoding means comprises a Viterbi decoding means, and
said second decoding means comprises a Viterbi decoding means.

14. A signal processing system as set forth in claim 13, wherein it further comprises an intersymbol interference data updating means for producing new intersymbol interference data on the basis of at least said linearly equalized signal, and updating the corresponding intersymbol interference data of said memory means by said produced intersymbol interference data by using said decoded digital data as an address, and wherein said intersymbol interference data updating means for producing new intersymbol interference data based on the difference between said linearly equalized signal and the Viterbi decoded state from said second Viterbi decoding means, and updating the intersymbol interference in the memory means in the nonlinear cancellation means by said produced intersymbol interference data on the basis of the digital decoded signal from said second Viterbi decoding means as the address.

15. A signal processing system as set forth in claim 14, wherein said nonlinear cancellation means and said second Viterbi decoding means, each comprising a plurality of unit circuit means including
an address generating means,
a memory means which stores said intersymbol interference data,
a timing adjustment means which delays said linearly equalized signal by exactly a time until the address is produced,
a subtraction means which subtracts from the delayed linearly equalized signal output from said timing adjustment means the intersymbol interference data read out from said memory means, and
a Viterbi decoding means which Viterbi decodes the output data of said subtraction means,
wherein said address means in the first stage of said unit circuit means uses the output data of said first Viterbi decoding means to generate the address,
wherein the output data of said Viterbi decoding means in a certain stage of said unit circuit means is applied as input data ok the address generating means in the next stage of the unit circuit means,
wherein the output data of the said timing adjustment means in a certain stage of said unit circuit means is applied as input data of said timing adjustment means in the next stage of unit circuit,
wherein the Viterbi decoding means in the last stage of the unit circuit means functions as the second Viterbi decoding means, and
wherein said intersymbol interference data updating means updates the intersymbol interference data stored in the memory means in the plurality of unit circuit means.

16. A signal processing system comprising:
a linear equalization means for linearly equalizing an input continuous signal, and outputting time series linearly equalized signal;
an intersymbol interference data holding means having a memory which stores intersymbol interference among bits in the case of a reproduction of reference source signal as a predetermined plurality of intersymbol interference data;

a first ternary discrimination means for discriminating the ternary values of said linearly equalized signal and producing a first discrimination result;

a first partial response class IV decoding means for decoding the discriminated value of said ternary discrimination means by the partial response class IV method, and producing an address for reading out the intersymbol interference data stored in said intersymbol interference data holding means;

a delay means for delaying said linearly equalized signal by a predetermined time and producing a delayed linearly equalized signal;

a subtraction means for subtracting from said delayed linearly equalized signal said intersymbol interference data read out from said intersymbol interference data holding means;

a second ternary discrimination means for discriminating the ternary values of said subtraction results;

a second partial response class IV decoding means for decoding said ternary discriminated values by the partial response class IV method, and reproducing a digital signal; and an intersymbol interference data updating means for producing new intersymbol interference data by using said delayed linearly equalized signal and the target value, and updating the intersymbol interference data held in said intersymbol interference data holding means using said produced intersymbol interference data, by an address which is the output data of said second partial response class IV decoding means.

17. A signal processing system as set forth in claim 16, wherein said intersymbol interference data updating means, for each of said intersymbol interference data, subtracts said delayed linearly equalized signal from the target value until a predetermined number is reached and adds the result to provisional intersymbol interference data, and when the predetermined number is reached, adds the value obtained by multiplying a first coefficient with said intersymbol interference data and a value obtained by multiplying a second coefficient with said provisional intersymbol interference data, and updates using the same as the new intersymbol interference data.

18. A signal processing system as set forth in claim 17, wherein at the stage of the initial operation of said signal processing system, the initial value of said provisional intersymbol interference data is 0, and wherein said intersymbol interference data updating means updates using said produced intersymbol interference data as the intersymbol interference data.

19. A signal processing system as set in claim 16, further comprising means for monitoring fluctuations of said linearly equalized signal, wherein said linear equalization means comprises analog-digital conversion means for converting the input source signal to a digital signal and a transversal filter which linearly equalizes said digitally converted source signal, and wherein said intersymbol interference data updating means updates said intersymbol interference data stored in said memory means at said address produced by said first partial response class IV decoding means if said fluctuations of said linearly equalized signal monitored by said monitoring means are greater than a predetermined value, or at said address designated by said digital data reproduced by said second partial response class IV decoding means if said fluctuations of said linearly equalized signal monitored by said monitoring means are less than a predetermined value.

20. A signal processing method, comprising the steps of:

storing in memory means intersymbol interference among bits of digital data from reproduction of a reference source signal as a predetermined plurality of intersymbol interference data;

linearly equalizing an input continuous source signal;

cancelling intersymbol interference included in said linearly equalized signal including a first ternary discrimination step of discriminating by ternary values said linearly equalized signal, a partial response class IV decoding step of decoding a first discriminated signal produced by said first ternary discrimination step in accordance with partial response class IV standard to produce a read address for said memory means, a timing adjustment step of delaying said linearly equalized signal exactly until said read address is produced, and a first subtraction step of subtracting from said delayed linearly equalized signal adjusted in timing intersymbol interference data read out from said memory means using said read address;

decoding data from said cancelling step including a second ternary discrimination step of discriminating by ternary values a signal produced by said first subtraction step, and a second partial response class IV decoding step of decoding a second discriminated signal produced by said second ternary discrimination step in accordance with the partial response class IV standard to produce said decoded digital data; and producing new intersymbol interference data including a second subtraction step for calculating a difference between said delayed linearly equalized signal and said second discriminated signal, and a step of using as an update address said decoded digital data produced by said second partial response class IV decoding and updating said intersymbol interference data in said memory means at said update address using said produced new intersymbol interference data.

21. A signal processing method, comprising the steps of:

storing in memory means intersymbol interference among bits of digital data from reproduction of a reference source signal as a predetermined plurality of intersymbol interference data;

linearly equalizing an input continuous source signal;

cancelling intersymbol interference in said linearly equalized signal including a first decoding step of determining from trends in said linearly equalized signal a most likely first digital signal and a corresponding first state, an address producing step of producing a read address based on said first decoded digital signal and said first state, a timing adjustment step of delaying said linearly equalized signal exactly until said read address is produced, and a first subtraction step of subtracting from said delayed linearly equalized signal adjusted in timing intersymbol interference data read out from said memory means using said read address;

decoding data from said cancelling step and thereby generating decoded time series digital data corresponding to said input source signal including a second decoding step of determining from trends in a signal produced by said first subtraction step a most likely second digital signal and a second state for producing said decoded time series digital data; and producing new intersymbol interference data including a second subtraction step for calculating a difference between said delayed linearly equalized signal and said second digital signal and said second state, and wherein said intersymbol interference data updating step includes a step of using as an update address said digital decoded data decoded in said second decoding step and updating said intersymbol interference data in said memory means at said update address using said produced new intersymbol interference data.

22. A signal processing method as set forth in claim 21, wherein said first decoding step performs Viterbi decoding, and wherein said second decoding step performs Viterbi decoding.

23. A signal processing method, comprising the steps of:

storing in memory means intersymbol interference among bits of digital data from reproduction of a reference source signal as a predetermined plurality of intersymbol interference data;

linearly equalizing an input continuous source signal;

cancelling intersymbol interference included in said linearly equalized signal using said intersymbol interference data stored in said memory means;

decoding data from said cancelling step and thereby generating decoded time series digital data corresponding to said input source signal; and producing new intersymbol interference data using at least said linearly equalized signal including the steps of initializing said intersymbol interference data and provisional intersymbol interference data at an initiation stage, using said decoded digital data as a provisional address for said memory means each time said decoded data is produced, calculating a difference between said delayed linearly equalized signal and a target value for each said provisional address, and adding said difference to said provisional intersymbol interference data in said memory means at said provisional address to update said provisional intersymbol interference data, and updating said provisional intersymbol interference data by exactly a predetermined number of times for said provisional address, then using a sum of a value obtained by dividing said intersymbol interference data by a first coefficient and a second value obtained by dividing said provisional intersymbol interference data by a second coefficient as said new intersymbol interference data, and storing said new intersymbol interference data at said provisional address for said memory means.

24. A signal processing method as set forth in claim 23, further comprising a step, after said intersymbol interference data are updated for all address, of validating said cancellation step and making signal processing substantially operate.

25. A signal processing method as set forth in claim 24, wherein it further comprises a step, after said signal processing is made to operate, each time said decoded digital data is produced, of calculating said difference between said delayed linearly equalized signal and said target value, a step of using said decoded digital data as a provisional address and adding said difference to said provisional intersymbol interference data stored in said memory means at said provisional address to update said provisional intersymbol interference data in said memory means at said provisional address, and a step, after said provisional intersymbol interference data is updated a predetermined number of times, of using a second sum of a third value obtained by dividing said intersymbol interference data by a third coefficient and a fourth value obtained by dividing said provisional intersymbol interference data by a fourth coefficient as said new intersymbol interference data and updating said intersymbol interference data at said provisional address of said memory means.

26. A signal processing method, comprising the steps of:

storing in a memory means intersymbol interference among bits in the case of reproduction of a reference source signal to a digital signal as a predetermined plurality of intersymbol interference data;

linearly equalizing an input continuous source signal;

first decoding of determining from the trends of the linearly equalized signal the most likely first digital signal and its state;

producing the address for reading out intersymbol interference data stored in said memory means from said first decoded data;

cancelling the intersymbol interference included in the linearly equalized signal in said linear equalization means using said intersymbol interference data; and second decoding of determining from the time trends of the cancelled output data the most likely second digital signal and its second state and outputting said second digital signal as the reproduced discriminated signal.

27. A signal processing method as set forth in claim 26, wherein said first decoding step performs Viterbi decoding, and wherein said second decoding step performs Viterbi decoding.

28. A signal processing method as set forth in claim 27, wherein said cancellation step and said second Viterbi decoding step perform continuously several times the set of an address generating step, a timing adjustment step of delaying said linearly equalized signal by exactly a time until the address is produced, a subtraction step of subtracting from the timing adjusted delayed linearly equalized signal the intersymbol interference data read out from said memory means using the generated address, and a Viterbi decoding step of Viterbi decoding the output value of said subtraction step, and wherein said intersymbol interference data updating step updates the intersymbol interference data at the above plurality of steps.

29. A signal processing method as set forth in claim 27, wherein it comprises an analog-digital conversion step of converting the input continuous source signal to a digital signal before the said linear equalization step, and wherein said linear equalization step performs transversal filtering for linearly equalizing said digitally converted source signal.

30. A signal processing method as set forth in claim 29, wherein said input source signal is a signal obtained by reading out a video signal recorded on a recording medium upon which dynamic reading is performed.

31. A signal processing method, comprising the steps of:

linearly equalizing an input continuous analog signal, using a plurality of intersymbol interference data defined by intersymbol interference among bits in the case of reproduction of a reference source signal to a digital signal to cancel the intersymbol interference included in said linearly equalized signal, reproducing said cancelled linearly equalized signal to the digital data corresponding to said input source signal, and using said linearly equalized signal to produce new intersymbol interference data, and updating the said intersymbol interference data

32. A signal processing method, comprising the steps of:

linearly equalizing an input continuous analog signal;

using a plurality of intersymbol interference data defined by intersymbol interference among bits of digital data from reproduction of a reference source signal to cancel intersymbol interference included in a linearly equalized Signal produced by said linear equalization step;

reproducing digital data corresponding to said input source signal using a signal produced by said cancellation steps; and using said linearly equalized signal to produce new intersymbol interference data, and updating said plurality of intersymbol interference data including the steps of accumulating a difference between said linearly equalized signal and a target value until a predetermined number of times is reached, and when the predetermined number of times is reached, multiplying a first coefficient with said intersymbol interference data, multiplying a second coefficient with a cumulative value produced by said accumulation step, adding products of the respective multiplications, and using a sum of the addition as said new intersymbol interference data.

* * * * *

UNITED STATES PATENT AND TRADEMARK OFFICE
CERTIFICATE OF CORRECTION

PATENT NO. : 5,343,335

DATED : August 30, 1994

INVENTOR(S) : Masaaki Hara
Masaaki Hara

It is certified that error appears in the above-indentified patent and that said Letters Patent is hereby corrected as shown below:

On the title page item [56],
In <u>References Cited</u>, Patent No. 4,220,923, change "9/1930" to --9/1980--

Col. 3, line 55, after "2n]" insert --,--
line 57, change "Art" to --An--
line 60, after "table" insert --14.--
line 61, should not be a new paragraph Col. 4, line 47 should move up to line 43

Col. 5, line 54, after "intersymbol" insert - --

Col. 11, line 68, change "signals" to --signal;--

Col. 12, line 2, change "signals" to --signal--
line 29, change "including$" to --including;--
line 51, change "ternaryvalues" to --ternary values--

Col. 14, line 25, change "FIGS." to --FIG.--

Col. 16, line 67, change "IsI" to --ISI--

Col. 17, line 23, change "i" to --1--
line 38, change "i" to --1--
line 57, after "table" insert --14.--

Col. 18, line 18, change "$" to --S--
line 59, change "ISi" to --ISI--

UNITED STATES PATENT AND TRADEMARK OFFICE
CERTIFICATE OF CORRECTION

PATENT NO. : 5,343,335

DATED : August 30, 1994

INVENTOR(S) : Masaaki Hara

It is certified that error appears in the above-indentified patent and that said Letters Patent is hereby corrected as shown below:

Col. 19, line 22, change "I" to --1--
line 64, change "ternarydiscriminator" to --ternary discriminator--
line 68, change "ternarydiscriminator" to --ternary discriminator--

Col. 20, line 3, change "ternarydiscriminator" to --ternary discriminator--
line 64, change "i" to --1--

Col. 21, line 23, change "ternarydiscriminator" to --ternary discriminator--
lines 26 & 27, change "ternarydiscriminator" to --ternary discriminator--
line 27, change "PRIV" to --PR-IV--

Col. 22, line 39, change "D" to --$\beta$--

Col. 23, line 46, after "equalizer" insert --4--

UNITED STATES PATENT AND TRADEMARK OFFICE
CERTIFICATE OF CORRECTION

PATENT NO. : 5,343,335
DATED : August 30, 1994
INVENTOR(S) : Masaaki Hara

It is certified that error appears in the above-indentified patent and that said Letters Patent is hereby corrected as shown below:

```
Col. 26, line 21, after "system" delete ","
Col. 32, line 45, change "ok" to --of--

Col. 38, line 6, change "Signal" to --signal--

Delete claim 31 as being based on a claim that was
     cancelled from the application.
```

Signed and Sealed this

Eighth Day of August, 1995

*Attest:*

BRUCE LEHMAN

*Attesting Officer*  *Commissioner of Patents and Trademarks*